United States Patent
Walli et al.

(10) Patent No.: US 11,586,270 B1
(45) Date of Patent: Feb. 21, 2023

(54) LOW-POWER MODES FOR A VEHICLE TELEMATICS DEVICE

(71) Applicant: Geotab Inc., Oakville (CA)

(72) Inventors: Thomas Arthur Walli, Hamilton (CA); James Patrick Howell, Toronto (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/717,461

(22) Filed: Apr. 11, 2022

Related U.S. Application Data

(60) Provisional application No. 63/327,864, filed on Apr. 6, 2022.

(51) Int. Cl.
| | |
|---|---|
| *G06F 1/32* | (2019.01) |
| *G06F 1/3231* | (2019.01) |
| *G07C 5/00* | (2006.01) |
| *G07C 5/08* | (2006.01) |
| *G06F 1/3234* | (2019.01) |

(52) U.S. Cl.
CPC .......... *G06F 1/3231* (2013.01); *G06F 1/3234* (2013.01); *G07C 5/008* (2013.01); *G07C 5/085* (2013.01)

(58) Field of Classification Search
CPC ........................................................ G06F 1/32
See application file for complete search history.

(56) References Cited

U.S. PATENT DOCUMENTS

| | | | |
|---|---|---|---|
| 2008/0061943 A1 | 3/2008 | Wu | |
| 2008/0120201 A1 | 5/2008 | Velazquez | |
| 2008/0262646 A1 | 10/2008 | Breed | |
| 2010/0149028 A1 | 6/2010 | Mermet | |
| 2011/0316676 A1 | 12/2011 | Bajic | |
| 2012/0193981 A1* | 8/2012 | Przybylski | B60R 25/33 307/9.1 |
| 2012/0203441 A1* | 8/2012 | Higgins | G07C 5/008 701/102 |
| 2014/0274223 A1* | 9/2014 | Kleve | H04W 52/0209 455/574 |
| 2015/0355703 A1* | 12/2015 | Macdonald | G06F 1/3231 701/36 |
| 2017/0064634 A1 | 3/2017 | Van Horn | |
| 2017/0174157 A1* | 6/2017 | Deljevic | B60L 58/12 |
| 2017/0313269 A1 | 11/2017 | Breed | |
| 2018/0086290 A1* | 3/2018 | Makke | B60R 16/023 |
| 2020/0272221 A1* | 8/2020 | Foster | H04W 4/029 |

FOREIGN PATENT DOCUMENTS

EP 4024806 A1 7/2022

* cited by examiner

*Primary Examiner* — Paul B Yanchus, III
(74) *Attorney, Agent, or Firm* — Sherif A. Abdel-Kader

(57) ABSTRACT

Methods and systems of enabling a storage mode on a telematics device coupled to a vehicle are provided. One method includes detecting a first event or receiving a command for enabling a storage mode, entering the storage mode in which the telematics device is in a sleep mode in response to receiving the first event or the command, and exiting the storage mode in response to detecting a second event.

14 Claims, 22 Drawing Sheets

LOW-POWER MODES FOR A VEHICLE TELEMATICS DEVICE

FIELD

The present disclosure relates generally to vehicle telematics, and more specifically to low-power modes for a vehicle telematics device.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method in a telematics device. The method comprises detecting a first event or receiving a command for enabling a storage mode, entering the storage mode in which the telematics device is in a sleep mode in response to receiving the first event or the command, and exiting the storage mode in response to detecting a second event.

Detecting the first event may comprise detecting that a storage mode duration threshold has been exceeded while the telematics device is running a power-saving scheme.

The power-saving scheme may comprise a first stage and a second stage.

The telematics device may enter the second stage of the power-saving scheme when the telematics device has been in the first stage for more than a long sleep threshold.

Detecting that the storage mode duration threshold has been exceeded comprises detecting that the storage mode duration threshold has been exceeded since a starting point of the second stage.

In the first stage the telematics device may periodically sleep for a first sleep duration and wake up for a wake-up duration. In the second stage the telematics device may periodically sleep for a second sleep duration and wake up for the wake-up duration. The second sleep duration may be greater than the first sleep duration.

Receiving the command may comprise receiving a storage mode enablement command from a telematics server.

The storage mode enablement command may be sent by the telematics server in response to a message from an administration terminal.

The storage mode enablement command may be sent by the telematics server in response to determining that the telematics device is located within a storage facility zone.

The storage mode enablement command may include a storage mode expiry duration, and the second event may comprise an expiry of a timer having an expiry period set to the storage mode expiry duration.

Detecting the second event comprises detecting a motion detection event.

The motion detection event may comprise reading a plurality of acceleration values each of which being greater than a first acceleration threshold for a period of time exceeding a storage mode motion duration threshold.

Detecting the second event may comprise detecting an expiry of a timer configured with an expiry period equal to the storage mode motion duration threshold.

Entering the storage mode may further comprise checking whether a vehicle coupled to the telematics device is on. In response to determining that the vehicle is on, waiting until the vehicle is off before entering the storage mode, and if the vehicle is off, entering the storage mode.

In another aspect of the present disclosure, there is provided a telematics device. The telematics device comprises a controller, a network interface coupled to the controller, and a memory coupled to the controller, the memory storing machine-executable programming instructions. The machine-executable programming instructions when executed by the controller configure the telematics device to detect a first event or receive a command for enabling a storage mode, enter the storage mode in which the telematics device is in a sleep mode in response to receiving the first event or the command, and exit the storage mode in response to detecting a second event.

The machine-executable programming instructions which configure the telematics device to detect the first event may comprise machine-executable programming instructions which configure the telematics device to detect that a storage mode duration threshold has been exceeded while the telematics device is running a power-saving scheme.

The command may comprise a storage mode enablement command.

The storage mode enablement command may be sent by the telematics server in response to determining that the telematics device is located within a storage facility zone.

The storage mode enablement command may include a storage mode expiry duration, and the second event may comprise an expiry of a timer having an expiry period set to the storage mode expiry duration.

In yet another aspect of the present disclosure, there is provided another method by a telematics device. The method comprises detecting a first event or receiving a command for enabling a transportation mode, running a transportation mode power-saving scheme in response to receiving the first event or the command, and exiting the transportation mode power-saving scheme in response to detecting a second event.

Detecting the first event may comprise detecting that a storage mode expiry duration has been exceeded while the telematics device is in a storage mode.

Detecting the first event may comprise receiving a firmware update containing a parameter set to enable the transportation mode power-saving scheme.

Receiving the command may comprise receiving a transportation mode enablement command from a telematics server.

The transportation mode enablement command may be sent by the telematics server in response to a message from an administration terminal.

The transportation mode enablement command may be sent by the telematics server in response to determining that the telematics device is located within a shipping zone.

Running a transportation mode power-saving scheme may comprise configuring the telematics device alternate between a sleep duration and a wake-up duration.

In some embodiments, in the sleep duration the telematics device is in a sleep mode and in the wake-up duration the telematics device is not in the sleep mode.

In the wake-up duration, the telematics device may determine a location of the telematics device and send an update comprising location data of the telematics device to a telematics server.

In the wake-up duration, the telematics device may determine a current location of the telematics device. If the current location of the telematics device is different from a previous location of the telematics device, the method may include configuring the sleep duration to a shorter sleep duration and sending an update comprising location data of the telematics device to a telematics server.

In the wake-up duration, the telematics device may determine a current location of the telematics device. If the current location of the telematics device is similar to a previous location of the telematics device, the method further comprises configuring the sleep duration to a longer sleep duration and refraining from sending an update comprising location data of the telematics device to a telematics server.

Running a transportation mode power-saving scheme may further comprise configuring an inertial measurement unit to detect one of an impact, a fall, and an orientation change. In response to detecting one of: the impact, the fall, or the orientation change, the method may further comprise temporarily waking up the telematics device to capture the impact, the fall, or the orientation change and sending an update comprising an indication of the impact or the orientation change to a telematics server.

The update may further comprise location data of the telematics device.

Detecting the impact may comprise detecting an acceleration value that is greater than an impact acceleration threshold in an X-Y plane of a vehicle in which the telematics device is installed.

Detecting the fall may comprise detecting an acceleration value above a certain threshold in a Z-direction relative to a vehicle in which the telematics device is installed.

Detecting the orientation change may comprise detecting, by a gyroscope, an unexpected orientation.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
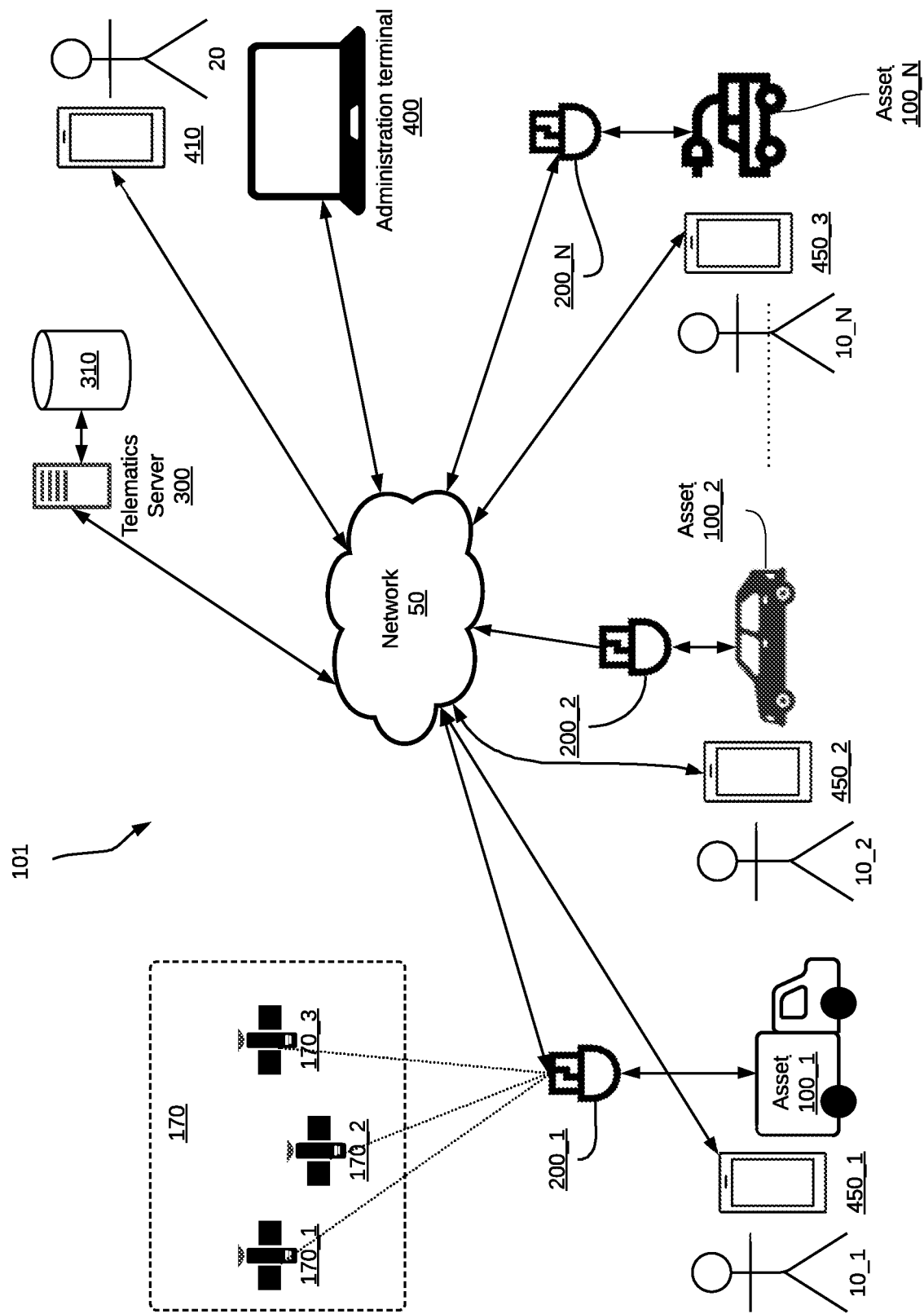
FIG. 1 is a schematic diagram of a telematics system including a plurality of telematics devices coupled to a plurality of assets.
Figure 2:
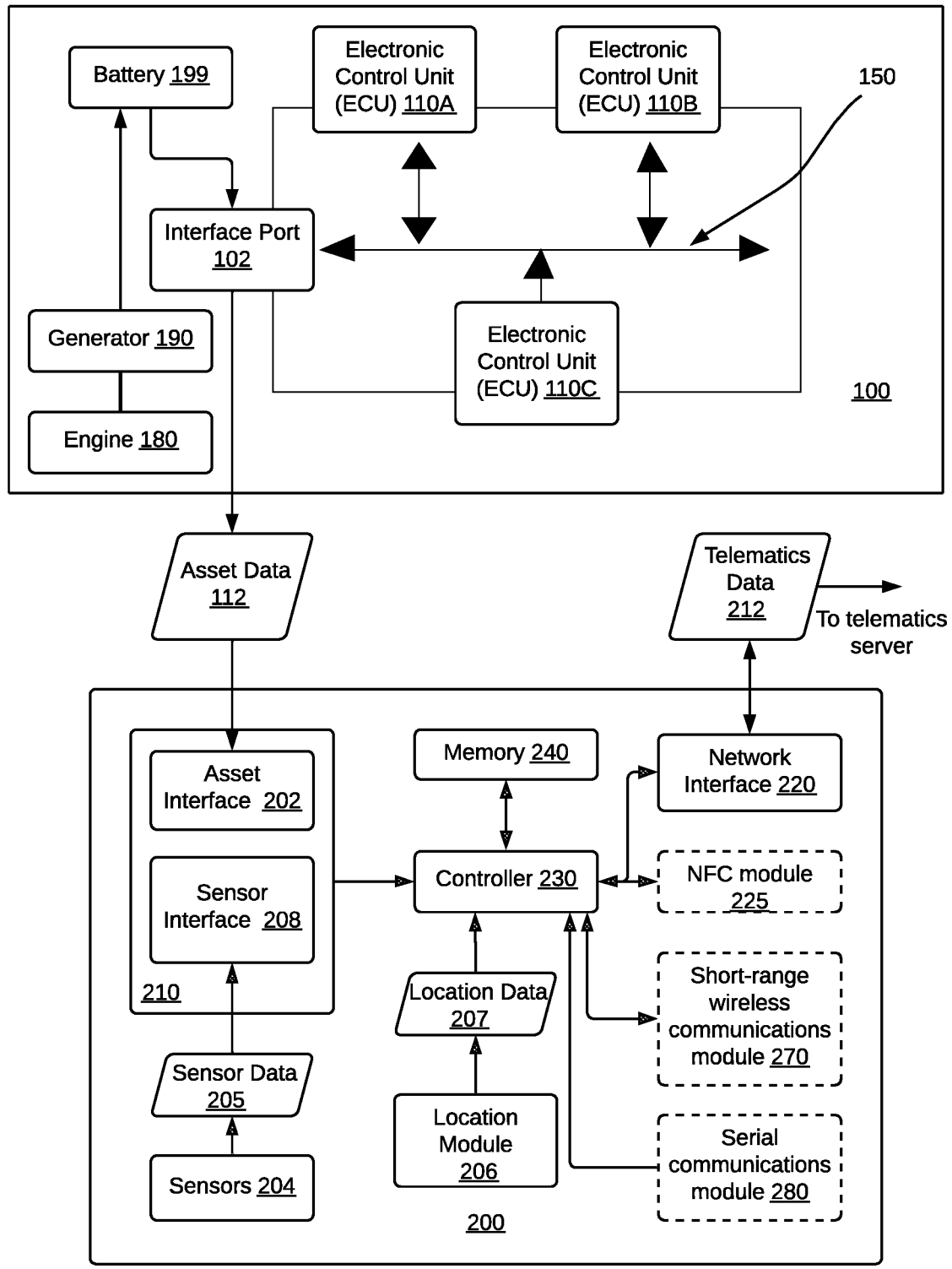
FIG. 2 is a block diagram showing a telematics device coupled to an asset.

A large telematics system may collect data from a high number of assets, either directly or through telematic devices. A telematics device may refer to a self-contained device coupled to an asset, or a telematics device that is integrated into the asset itself. In either case, it may be said that asset data is being captured or gathered by the telematics device. Detailed operation of a telematics system 101 and its components are best described with reference to FIG. 1 and FIG. 2. FIG. 1 shows a high-level block diagram of a telematics system 101, while FIG. 2 shows a detailed view of an asset 100 and a telematics device 200 coupled to the asset 100. The telematics system 101 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminal 450"). FIG. 1 also shows a plurality of (N) assets named as asset 100_1, asset 100_2 . . . asset 100_N ("asset 100") coupled to the telematics device 200_1, the telematics device 200_2 . . . the telematics device 200_N, respectively. Additionally, FIG. 1 shows a plurality of satellites 170_1, 170_2 and 1703 ("satellite 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like. Additionally, the asset 100 may be any industrial equipment or machine, which can be monitored by a telematics device 200 coupled thereto.

The telematics devices 200 are electronic devices which are coupled to the assets 100 and are configured to capture asset data 112 from the assets 100. The telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable programming instructions which enable the telematics server 300 to store and analyze telematics data 212. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50 and may receive telematics data 212 from the telematics devices 200. The telematics server 300 may have a plurality of software modules for performing data analysis and analytics on the telematics data 212 to derive useful information pertaining to the assets 100 and/or the operators 10. The telematics server 300 may be coupled to a telematics database 310 for storing the telematics data 212 and/or the results of the analytics which are related to the assets 100. The telematics data 212 stored may include sensor data 205 obtained from the sensors 204 deployed in the telematics device 200. The telematics server 300 may communicate the telematics data 212 or the derived information therefrom to one or more of: the administration terminal 400, the handheld administration terminal 410, and the operator terminal 450. In some instances, the telematics server 300 may send configuration commands to the telematics device 200 to configure the operation of the telematics device 200. For example, a fleet manager 20 may use an administration terminal 400 to configure a telematics device 200 to carry out a particular function or operate in a particular mode. The administration terminal 400 may send a configuration request to the telematics server 300, which in turn forwards it to the telematics device 200.

The satellites 170 may be part of a global navigation satellite system (GNSS) and may provide positioning information to the telematics devices 200. The positioning information may be processed by a location module on the telematics device 200 to provide location data 207 indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100 or to issue commands to one or more telematics device 200 via the telematics server 300. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface of the telematics server 300. The handheld administration terminal 410 may run a mobile application for communicating with the telematics server 300, the mobile application allowing retrieving data and analytics therefrom. The mobile application of the handheld administration terminal may also be used to issue commands to one or more telematics device 200 via the telematics server 300 as discussed above. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of the assets 100. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is being currently operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating. In some embodiments, the operator terminal 450 may communicate directly with the telematics device 200 over a wired connection or over a short-range wireless connection.

In operation, a telematics device 200 is coupled to an asset 100 to capture the asset data 112. The asset data 112 may be combined with the location data 207 obtained by the telematics device 200 from a location module 206 in communication with the satellites 170 and/or sensor data gathered from sensors in the telematics device 200 or another device coupled to the telematics device 200. The combination of the asset data 112, the location data 207, and the sensor data 205 comprise the telematics data 212. The telematics device 200 sends the telematics data 212, to the telematics server 300 over the network 50.

The telematics server 300 may process, aggregate, and analyze the telematics data 212 to generate or derive asset information pertaining to an asset 100, to an operator 10, and/or to a fleet of assets. For example, the telematics server 300 may track the mileage of a vehicle asset based on reported location data. The telematics server 300 may store the telematics data 212 and/or the generated asset information in the telematics database 310. The administration terminal 400 may connect to the telematics server 300, over the network 50, to access the generated asset information. Alternatively, the telematics server 300 may push the generated asset information to the administration terminal 400.

Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data 212 may include turning, speeding, and braking information. The telematics server 300 can correlate the telematics data to the asset's operator 10 by querying the telematics database 310. A fleet manager 20 may use the administration terminal 400 to set alerts for certain activities pertaining to the assets 100. When criteria for an alert is met, the telematics server 300 sends a message to the fleet manager's administration terminal 400, and may optionally send alerts to the operator terminal 450 to notify an operator 10 of the alert. For example, a vehicle driver operating the vehicle outside of a service area or hours of service may receive an alert on their operator terminal 450.

A fleet manager 20 may also the administration terminal 400 to configure a telematics device 200 by issuing commands thereto via the telematics server 300.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may be a vehicle having many components. Selected components of the asset 100 are shown in FIG. 2. For example, the asset 100 is shown to have an engine 180, a generator 190, a battery 199, a plurality of electronic control units (ECUs) 110 connected via a CAN bus 150, and an interface port 102. It is understood that the asset 100 may have many other components and subsystems, which are not depicted for simplicity.

The engine 180 may be an internal combustion engine (ICE), such as a diesel engine or a gasoline engine. Alternatively, the engine 180 may be an electric motor. The generator 190 may be an alternator which converts mechanical energy generated by the engine 180 to electrical energy. The battery 199 may be a lead acid battery or any other type of battery for providing power to various components of the asset 100.

An ECU 110 is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle asset may, for example, have around seventy ECUs. For simplicity, only a few of the ECUs 110 are depicted in FIG. 2. For example, in the depicted embodiment the asset 100 has three electronic control units: ECU 110A, ECU 110B, and ECU 110C ("ECUs 110"). The ECU 110A, the ECU 110B, and the ECU 110C are shown to be interconnected via an asset communications bus, such as a Controller Area Network (CAN) bus 150. The ECUs 110, which are interconnected using the CAN bus 150 send and receive information to one another in CAN data frames by placing the information on the CAN bus 150. When an ECU 110 places information on the CAN bus 150, other ECUs 110 receive the information and may or may not consume or use that information. Different protocols may be used to exchange information between the ECUs 110 over a CAN bus 150. For example, ECUs 110 in trucks and heavy vehicles use the Society of Automotive Engineering (SAE) J1939 protocol to exchange information over a CAN bus 150. Most passenger vehicles use the SAE J1979 protocol, which is commonly known as On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 coupled thereto. For example, a telematics device 200 may be powered by the battery 199 of the asset 100 via the interface port 102. The battery 199 may be charged by the generator 190 when the engine 180 is running.

The telematics device 200 includes a telematics device controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 225, a short-range wireless communications module 270, and a wired communications module such as a serial communications module 280. In some embodiments (not shown), the telematics device 200 may have a dedicated power source such as a battery or a solar panel. In other embodiments, the telematics device 200 may receive electric power directly from the asset 100, via the interface port 102. In some embodiments, some of the components of the telematics device 200 shown in solid lines in FIG. 2 may also be optional and may be implemented in separate modules. For example, some telematics devices 200 (not shown) may not have a location module 206 and may rely on an external location module for obtaining the location data 207. Some telematics devices may not have any sensors 204 and may rely on external sensors for obtaining sensor data 205. The external location modules and external sensors may be coupled to the telematics device via the short-range wireless communications module 270 or via a wired communications module such as the serial communications module 280.

The telematics device controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the telematics device controller 230 as described herein. The telematics device controller 230 may have an internal memory for storing machine-executable programming instructions to carry out the methods described herein. Alternatively, the telematics device controller 230 may be coupled to an external memory, such as the memory 240 and execute machine-executable programming instructions stored in the memory 240.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the telematics device controller 230 thus enabling the telematics device controller 230 to execute the machine-executable programming instructions stored in the memory 240 and to access the data stored therein. The memory 240 may contain machine-executable programming instructions, which when executed by the telematics device controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the telematics device controller 230, configures the telematics device 200 to transmit the telematics data 212 via the network interface 220 to a telematics server 300 over a network 50. In some embodiments, the memory 240 only stores data, and the machine-executable programming instructions for carrying out the aforementioned tasks are stored in an internal memory of the telematics device controller 230.

The location module 206 may be a global positioning system (GPS) transceiver or another type of location determination peripheral that may use, for example, wireless network information for location determination. The location module 206 is coupled to the telematics device controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors 204 provide sensor data 205 to the telematics device controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the asset data 112 may describe the speed at which the vehicle is travelling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the telematics device controller 230 and provides both the asset data 112 and the sensor data 205 to the telematics device controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for storage and analysis. The network interface 220 may also be used to receive instructions from the telematics server 300 for configuring the telematics device 200 in a certain mode and/or requesting a particular type of the asset data 112 from the asset 100.

The NFC module 225 may be an NFC reader which can read information stored on an NFC tag. The NFC module 225 may be used to confirm the identity of the operator 10 by having the operator 10 tap an NFC tag onto the telematics device 200 such that the NFC tag is read by the NFC module 225. The information read from the NFC tag may be included in the telematics data 212 sent by the telematics device 200 to the telematics server 300.

The short-range wireless communications module 270 provides short-range wireless communication capability to the telematics device 200. The short-range wireless communications module 270 may be a Bluetooth™, wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I2C) bus. As another example, the serial communications module 280 may be a universal serial bus (USB) transceiver.

In operation, the ECUs 110, such as the ECU 110A, the ECU 110B, or the ECU 110C each places a portion of the asset data 112 on the CAN bus 150. The asset data 112 comprises all portions of asset data exchanged, between the ECUs 110, over the CAN bus 150. The CAN bus 150 is accessible via the interface port 102. The telematics device 200 reads the asset data 112 from the CAN bus 150 over the interface port 102 and the asset interface 202 which is connected to the interface port 102. The telematics device controller 230 receives the asset data 112 via the asset interface 202. The telematics device controller 230 may also receive sensor data 205 from the sensors 204 over the sensor interface 208. Furthermore, the telematics device controller 230 may receive location data 207 from the location module 206. The telematics device controller 230 combines the asset data 112 with the sensor data 205 and the location data 207 to obtain the telematics data 212. The telematics device controller 230 transmits the telematics data 212 to the telematics server 300 over the network 50 via the network interface 220. Optionally, an operator 10 may tap an NFC tag to the NFC module 225 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 300. The received commands instruct the telematics device 200 to be configured in a particular way. For example, the received commands may configure the way in which the telematics device 200 gathers asset data 112 from the asset 100.

The telematics data 212 which is comprised of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 225 or a short-range wireless communications module 270 thus limiting its connectivity capabilities. Some applications may require additional sensors, such as temperature sensors, humidity sensors, pressure sensors, conductivity sensors, pH sensors, and the like. To modify the telematics device 200 to include all of the aforementioned sensors and peripherals would be impractical. Not all applications require the additional sensors and the size and complexity of the telematics device 200 would be increased.

Input/Output Expander

Figure 3:
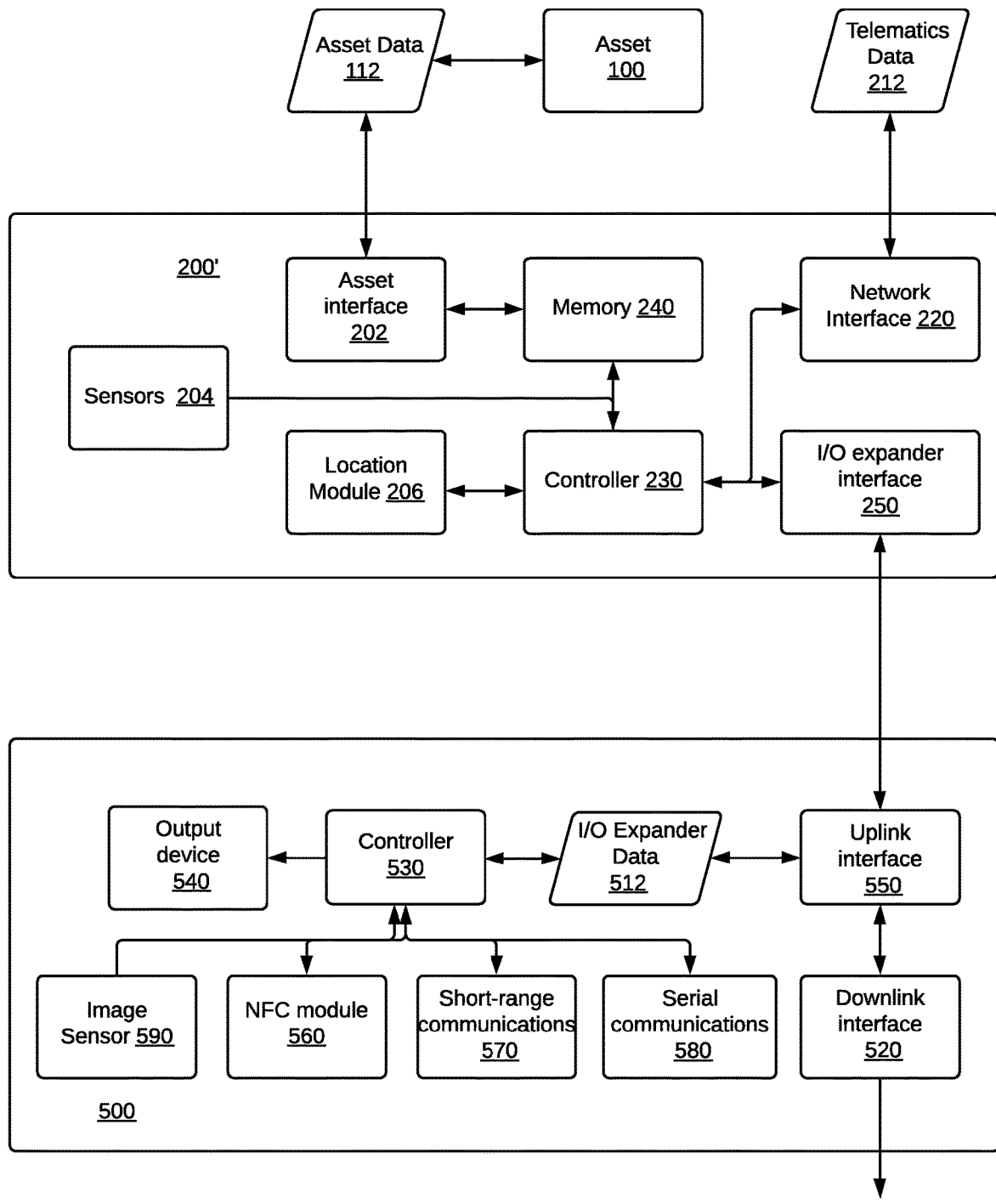
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 200' coupled to an asset 100. An I/O expander 500 is coupled to the telematics device 200'.

The asset 100 is similar to the asset 100 of FIG. 2 and therefore the internal components thereof are not shown in FIG. 3 for simplicity.

The telematics device 200' has a somewhat similar configuration as the telematics device 200 of FIG. 2, but some of the optional components have been removed. Furthermore, the telematics device 200' adds an I/O expander interface 250 for interfacing with the I/O expander 500. The I/O expander interface 250 is coupled to the telematics device controller 230 and may be configured for exchanging I/O expander data 512 with the I/O expander 500.

The I/O expander 500 of FIG. 3 is an example I/O expander which is designed to provide additional connectivity options to a telematics device 200, which has more limited features than the one shown in FIG. 2. For example, the telematics device 200' shown in FIG. 3 does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 3 shows an I/O expander 500 containing several components which may or may not all be present in other I/O expanders. For example, the I/O expander 500 includes an I/O expander controller 530, an NFC module 225, an output device 540, a short-range communications module 570, an image sensor 590, a serial communications module 580, an uplink interface 550 and a downlink interface 520.

The I/O expander controller 530 may be similar to the telematics device controller 230 of FIG. 3. In some embodiments, the I/O expander controller 530 is a microcontroller with versatile I/O capabilities. For example, the I/O expander controller 530 may be a microcontroller which has a plurality of I/O ports such as general-purpose inputs and outputs (GPIOs), serial ports, analog inputs, and the like. In some embodiments, the I/O expander controller 530 may have built-in persistent memory such as flash memory on which machine-executable programming instructions for carrying out the functionality of the I/O expander 500 may be stored. In other embodiments, the I/O expander controller 530 may be coupled to a persistent memory module (not shown) that contains the machine-executable programming instructions for carrying out the functionality of the I/O expander 500. The I/O expander controller 530 may also have built-in volatile memory, such as random-access memory (RAM) for storing data. Alternatively, the I/O expander 500 may be connected to an external volatile memory for storing data.

The output device 540 receives data from the I/O expander controller 530 and performs an output function. For example, the output device 540 may include a display for displaying information received from the I/O expander controller 530. As another example, the output device 540 may include a speech synthesizer and a speaker for displaying audible information received from the I/O expander controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 225, short-range wireless communications module 270, and the serial communications module 280 described above with reference to FIG. 2.

The image sensor 590 may be a digital still camera or a digital video camera capable of capturing images. For example, the image sensor 590 may be a road-facing dashboard camera for monitoring the road ahead. In other examples, the image sensor 590 may be a driver-facing dashboard camera for identifying the operator 10 and/or their condition.

The uplink interface 550 is an electronic peripheral interface coupled to the I/O expander controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500. Allowing the uplink interface 550 to connect to the downlink interface 520 of another I/O expander 500 allows the daisy chaining of I/O expanders 500. Accordingly, I/O expander data 512 received at the downlink interface 520 may be routed to the uplink interface 550. Additionally, power signals from the uplink interface 550 of the I/O expander 500 are coupled to power pins of the downlink interface 520. This allows the I/O expander 500 to power another I/O expander connected thereto in a daisy chain of I/O expanders. For example, a telematics device 200 may provide power up to a number of I/O expanders 500. This is further described below.

The I/O expander 500 may be configured as an input expander, as an output expander, or as an input and an output (I/O) expander.

Configured as an input expander, one or more of the image sensor 590, the NFC module 560, the short-range communications module 570 and the serial communication module 580 may provide input data to be processed by the I/O expander controller 530 to generate the I/O expander data 512. The I/O expander data 512 is in a format that can be consumed by the telematics device 200. The I/O expander controller 530 configures the uplink interface 550 to send the I/O expander data 512 to the telematics device 200 via the I/O expander interface 250 of the telematics device 200.

Configured as an output expander, the I/O expander 500 receives I/O expander data 512 from the telematics device 200 over the uplink interface 550. The I/O expander controller 530 receives the I/O expander data 512 from the uplink interface 550 and may perform further processing on the I/O expander data 512. The I/O expander controller 530 then sends the I/O expander data 512 to the output device 540, or to an external output device connected to the I/O expander via one of the NFC module 560, the short-range communications module 570, and the serial communications module 580.

In some embodiments, multiple I/O expanders 500 may be daisy chained. The I/O extension devices are typically daisy chained to provide additional functionality without having to include multiple I/O expansion interfaces 250 on the telematics device 200. Daisy chaining the multiple I/O expanders 500 is done by connecting the uplink interface 550 of one I/O expansion device to the downlink interface 520 of a preceding I/O expander 500.

Integrated Telematics Device

Figure 4:
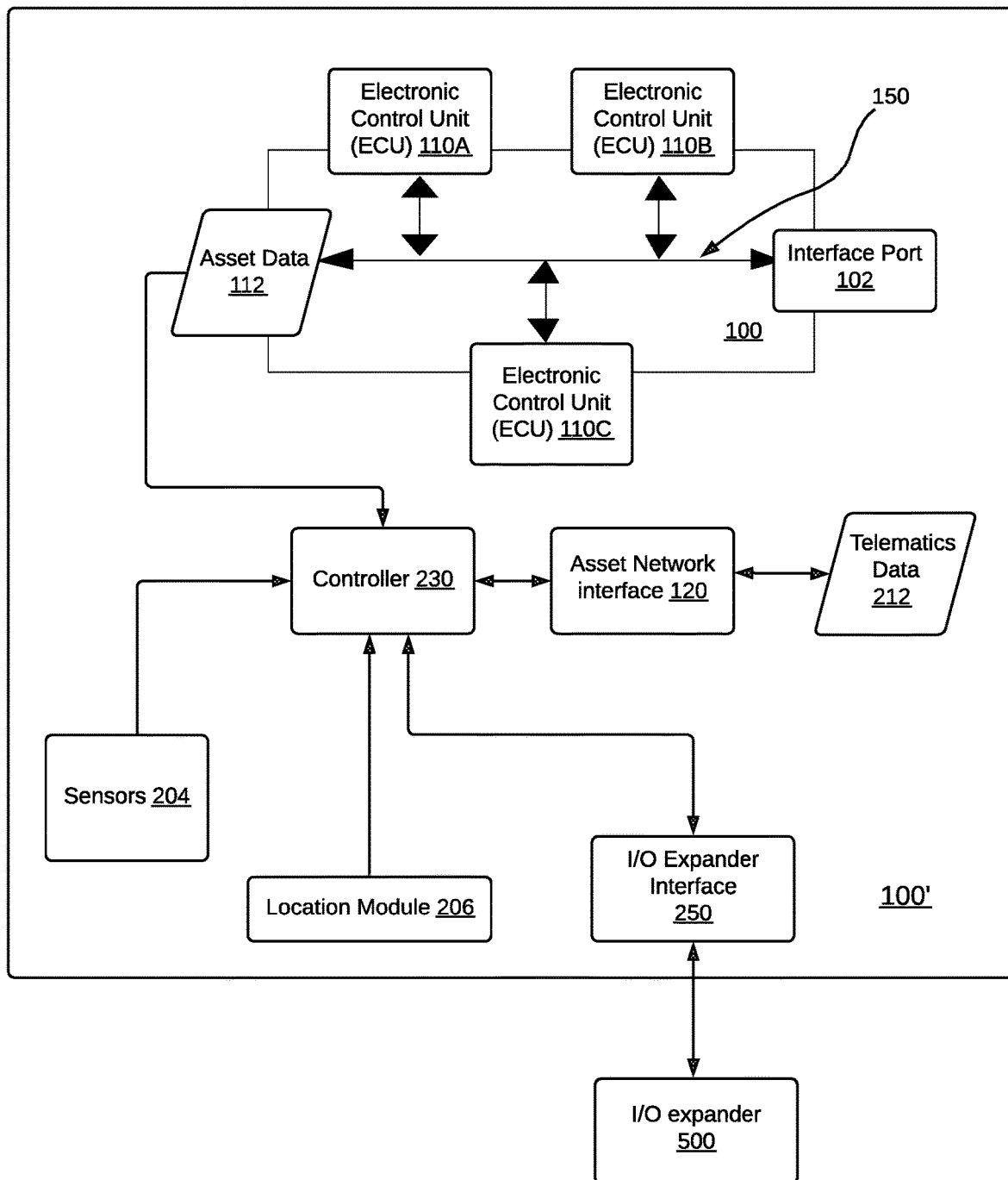
FIG. 4 is a block diagram showing an asset having a telematics device integrated therein and I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 100' with the components of a telematics device integrated therein, in accordance with embodiments of the present disclosure. The asset 100' is similar to the asset 100 but, being a connected asset such as a connected car, it has an asset network interface 120 built into it. In the depicted embodiment, the telematics device controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the telematics device controller 230 as described above. The asset network interface 120 belongs to the asset 100' and may be used by the asset 100 to communicate with an original equipment manufacturer (OEM) server, to a roadside assistance server, or for other purposes. The telematics device controller 230 may utilize the asset network interface 120 for the transmission of telematics data 212 provided by the telematics device controller 230. In order to support gathering data types not provided by the integrated peripherals such as the sensors 204 and the location module 206, the asset 100' has an I/O expander interface 250 coupled to the telematics device controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Power Consumption of a Telematics Device Coupled to a Vehicle

A telematics device 200 deployed in an asset whether connected to an interface port 102 or integrated within the asset may be configured as an asset tracking device in that it tracks and reports the location of the asset at all times. However, a distinction is made between cases when the vehicle is on and in motion and when the vehicle is off, as will be described below.

While the vehicle is operational with the ignition turned on (or the electric motor of an EV is on), a telematics device 200 obtains and sends telematics data 212 to the telematics server 300 as described above. In order to report the location data 207 with a fine granularity (i.e., the location up to a few meters' accuracy), the location data 207 is reported to the telematics server 300 several times per second. For example, a vehicle travelling at 60 km/h moves 16 meters per second. A vehicle moving at 120 km/h moves 32 meters per second. Reporting the location data 207 along with other asset data 112 in real-time or near real-time, requires the telematics device 200 to be in a fully operational mode in which it gathers the asset data 112, the sensor data 205 and the location data 207, combines them into telematics data 212 and sends the telematics data 212 over the network interface 220. The sensors 204, the location module 206, the interface module, and the network interface 220 all have to be powered up during the fully operational mode. The telematics device 200 obtains power from a power source of the asset 100, such as the battery 199. When the asset 100 is travelling, the engine 180 is running and the generator 190 is charging the battery 199.

When the vehicle is off (i.e., the ignition of an ICE vehicle is off or the EV is off), there is little to no asset data 112 generated by the ECUs 110. This is the case, for example, when a vehicle is parked. As such, having the telematics device 200 in a fully operational mode with all the components such as the network interface 220 powered up all the time is unnecessary. Furthermore, as the engine 180 is not running, the generator 190 is not charging the battery 199. If the telematics device 200 is in a fully operational mode with many components powered on, the telematics device 200 may deplete the battery 199 over time as it continues to draw electric power therefrom.

One approach to reducing power consumed by the telematics device 200 when it is coupled to a vehicle asset which is not turned on is to implement a low-power scheme for the telematics device 200. In a low-power scheme (or a power-saving scheme), the telematics device 200 enters a low-power mode (also known as sleep mode) and periodically wakes up. In other words, the telematics device 200 alternates between a sleep duration and a wake-up duration. During a sleep duration, the telematics device controller 230 of the telematics device 200 is running at a slower clock speed (i.e., is in a slow-clocking mode), and most of the peripherals such as the sensors 204, location module 206, and network interface 220 are powered off. During a wake-up duration, the telematics device controller 230 exits the slow-clocking mode and the peripherals are powered on. The telematics device 200 may report the location thereof as the location data 207, which is part of the telematics data sent to the telematics server 300 during the wake-up duration. Since the vehicle is off, little to no asset data 112 is included in the telematics data 212 sent to the server. In this low-power scheme, the longer the sleep duration between two wake-up durations, the less the telematics server 300 receives updates about the location of the telematics device 200, for example. However, a short sleep duration, which translates to more frequent wake-up durations consumes more electric power. Examples of a short sleep duration range from a few minutes to an hour. Examples of a long sleep duration range from a few hours to a few days. One combined approach is to use a short sleep duration until a long sleep duration threshold is met or exceeded, and then using a long sleep duration. This approach assumes that a vehicle that is not turned on for some time may be parked for an extended period of time and accordingly, receiving a frequent update about the vehicle's location is of less importance. The combined approach to a low-power scheme is explained further with reference to FIG. 5A.

Figure 5A:
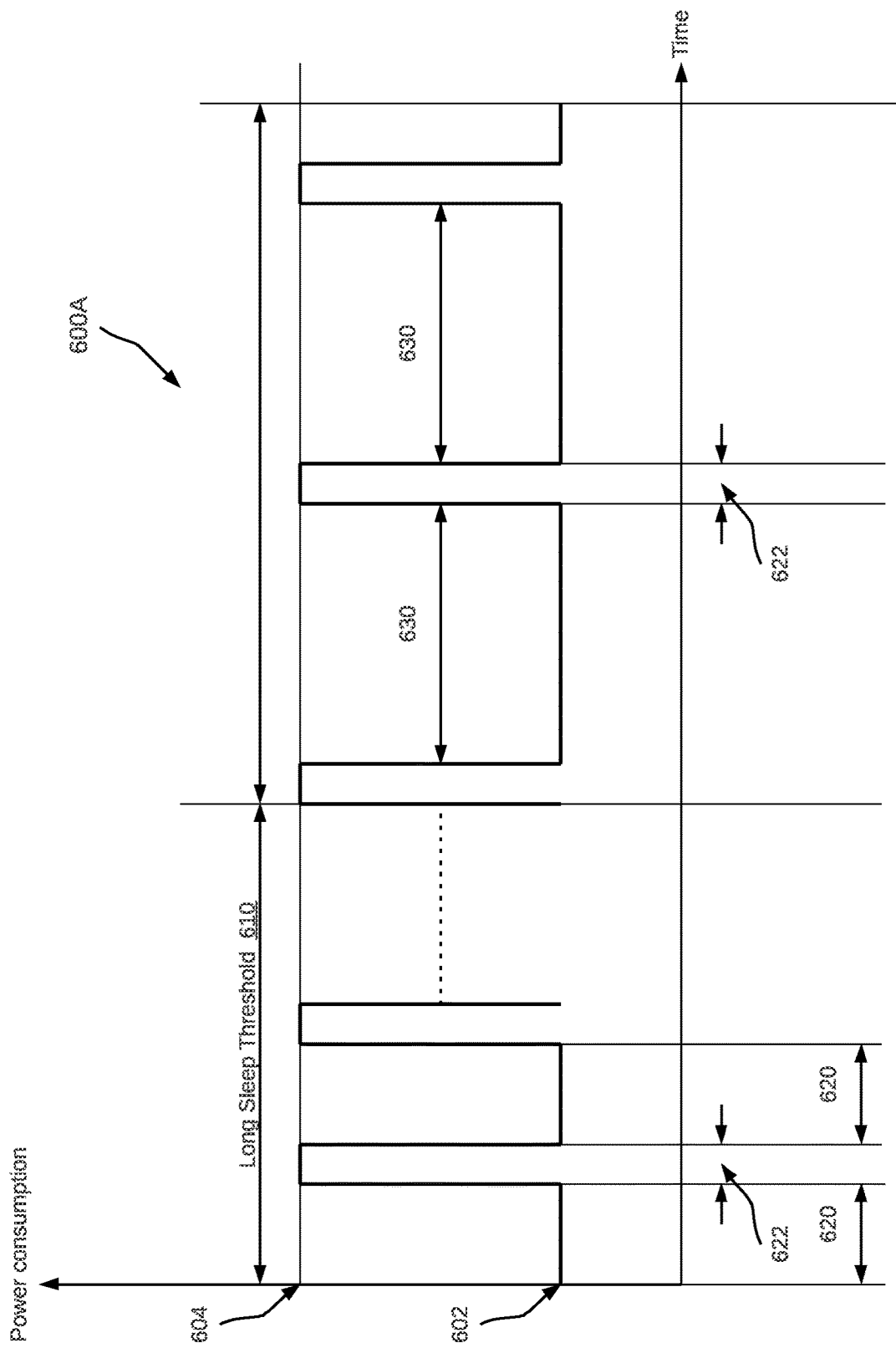
FIG. 5A is a graph showing the power consumption of the telematics device versus time during a power-saving scheme.

FIG. 5A depicts a power-saving scheme 600A for operating a telematics device 200 when the asset 100, which may be a vehicle, to which the telematics device 200 is coupled is turned off. A vehicle is off when an ignition is off for a vehicle with an internal combustion engine. For an electric vehicle (EV), a particular signal indicates whether the vehicle is on or off. In FIG. 5A, the horizontal axis represents time, while the vertical axis represents the electric power consumption of the telematics device 200. At time 0, the telematics device 200 detects that the vehicle to which the telematics device 200 is coupled is off and therefore the telematics device 200 is now drawing power from the battery 199. The battery 199 may be drained if the telematics device 200 remains in fully operational mode. Accordingly, at time 0, the telematics device 200 operates in sleep mode. The power consumption of the telematics device during the sleep mode is represented by the sleep power consumption level 602. After a short sleep duration 620, the telematics device 200 exits sleep mode and is fully operational for a wake-up duration 622. During the wake-up duration 622, the telematics device 200 reports the location data 207 to the telematics server 300 via the network interface 220. The telematics server 300 updates the location of the telematics device 200 and updates the miles travelled by the asset 100 associated with the telematics device 200. The cycle comprised of the short sleep duration 620 and the wake-up duration 622 is repeated until a time threshold since the start of the first sleep duration (i.e., time 0 in the figure) is exceeded. The time threshold may be termed the long sleep threshold 610. If the long sleep threshold 610 is exceeded, the telematics device 200 switches to a long sleep duration 630. As seen in FIG. 5A, past the long sleep threshold 610, the telematics device sleeps for a long sleep duration 630 and wakes up for a wake-up duration 622. An example of the short sleep duration may include 30 minutes, while an example of a long sleep duration may be 23 hours.

In the event that the asset is turned on, the telematics device 200 upon detecting an ignition signal or an EV on signal, will stop executing the power-saving scheme 600A and will be in the fully operational mode.

The power-saving scheme 600A thus has a first stage in which the telematics device 200 alternates between lower-power (sleep) mode and powered-up (wake-up) mode. Specifically, the power-saving scheme 600A has a first stage and a second stage. In the first stage the telematics device periodically sleeps for a first sleep duration and wakes up for a wake-up (powered-up) duration. In the second stage the telematics device periodically sleeps for a second sleep duration and wakes up for the wake-up duration. The second stage of the power-saving scheme 600A is triggered after the telematics device has been in the first stage for a duration greater than a long sleep duration threshold. The second sleep duration used in the second stage is longer than the first sleep duration used in the first stage of the power-saving scheme 600A. The telematics device 200 enters the second stage when the telematics device 200 has been in the first stage for more than a long sleep threshold 610.

The power-saving scheme 600A proposed in FIG. 5A has a number of advantages. Initially, when an asset 100, such as a vehicle is turned off, the telematics device 200 provides location updates on a frequent basis, such as every 30 minutes. The power-saving scheme 600A works for a vehicle which is parked for a short-term such as overnight and is going to be driven in the morning, or for day or two at the airport parking, for example. During that time, the vehicle's owner or a fleet manager can verify the location of the vehicle with a relatively short frequency. If a vehicle is parked for an extended period of time, then the sleep duration is switched to a long sleep duration, which further reduces the power consumption of the telematics device 200 and reduces the possibility of draining the asset's battery, such as the battery 199.

While the power-saving scheme 600A shown in FIG. 5A is suitable for a vehicle asset that is stopped or parked for a short period of time, there are some cases where such a power-saving scheme is not optimal. When a vehicle is stored for a prolonged period, such as weeks, and when a vehicle is being transported, the power-saving scheme 600A may not be an appropriate power-saving scheme for the telematics device 200 coupled to the vehicle being stored or transported as explained further below.

The power-saving scheme 600A may not be optimal when a vehicle is stored for an extended period. For example, many vehicles, whether on-road or off-road, are fitted with integrated telematics devices at the time of manufacture. Such vehicles are to be transported to a corporate location where they will commence being in service. At the outset, the vehicles may be parked or stored for several weeks in a parking lot or a warehouse, before being transported to their final destination where they will be put in service. The power-saving scheme 600A may not be appropriate for use in a telematics device 200 that is being stored for several weeks for a number of reasons. The first stage of the power-saving scheme 600A, where the telematics device sleeps for a short sleep duration 620, is not necessary when the vehicle to which the telematics device 200 is coupled will be parked for several weeks awaiting being transported. Accordingly, the telematics device 200 may be partially draining the vehicle's battery unnecessarily. For a vehicle which is stored for a prolonged period of time such as weeks or months, even the second stage of the power-saving scheme 600A will eventually drain the battery of the vehicle in which the telematics device 200 is installed. Accordingly, a new power-saving mode or scheme is needed for handling a case where a vehicle is stored for an extended period of time.

After storage, the vehicle to which a telematics device 200 is coupled may be placed on a transport truck, ship, or train to be transported to a final destination, such as the corporate location. While the second stage of the power-saving scheme 600A may be appropriate for the telematics device 200 during transportation as location updates are provided, there are some concerns.

If a vehicle is transported while the telematics device 200 is employing the power-saving scheme 600A described above, the telematics device 200 reports location updates to the telematics server 300 and the telematics server 300 updates the mileage travelled by the vehicle. For cases where the telematics device 200 is deployed in a transport trailer with no ignition, the mileage travelled as detected by the location module 206 should be tracked by the telematics server 300. Similarly, if a vehicle has broken down and is being towed, the mileage travelled as detected by the location module 206 and reported to the telematics server 300 should also be tracked. However, for a new vehicle that is still being delivered to its operating destination, the telematics server 300 should exclude the mileage travelled based on the location data 207. In other words, the telematics server 300 should only start tracking mileage once the vehicle is put into operation after reaching its final destination. Accordingly, a new power-saving mode or scheme for transporting a vehicle having a telematics device 200 is needed. The new power-saving mode may be termed the "transportation mode". While a telematics device 200 is in transportation mode, the telematics server 300 may track the location of the telematics device 200, but does not add travel mileage to the vehicle associated with the telematics device 200.

In addition to the need to track a vehicle during transportation, and the need to exclude mileage travelled during the transportation of the vehicle, an owner or a fleet manager may need to track further information in respect of a vehicle being transported. For example, if the vehicle (or asset) undergoes an impact during transport, such as by dropping or due to a collision, a fleet manager may want to be notified of such events. In some cases, the orientation of the vehicle is also important. If the vehicle is in a box and the box is placed upside down, that information may need to be reported. Accordingly, a transportation mode power-saving scheme needs to track, and report impacts as well as change in orientation experienced by the telematics device 200 during the transportation of the vehicle to which the telematics device 200 is coupled.

In an attempt to overcome at least some of the aforementioned concerns, a telematics device 200 be configured to operate in a storage mode and a transportation mode power-saving scheme as will be described below. In this disclosure a "mode" of the telematics device 200 refers to an operating state in which the power consumption of the telematics device 200 does not change. For example, in a fully operating mode, the telematics device 200 has all of its peripherals powered up and the telematics device controller 230 is executing at the fastest clock speed possible. Similarly, in a storage mode (explained in detail below), the telematics device 200 has most of its peripherals powered down and the telematics device controller 230 is in sleep or slow-clocking state. In this disclosure, a "power-saving scheme" comprises alternating the telematics device 200 between a fully operating mode and a sleep mode for the purpose of saving power will also providing some functionality. The power-saving scheme 600A of FIG. 5A is an example of a power-saving scheme of the telematics device 200.

Figure 6A:
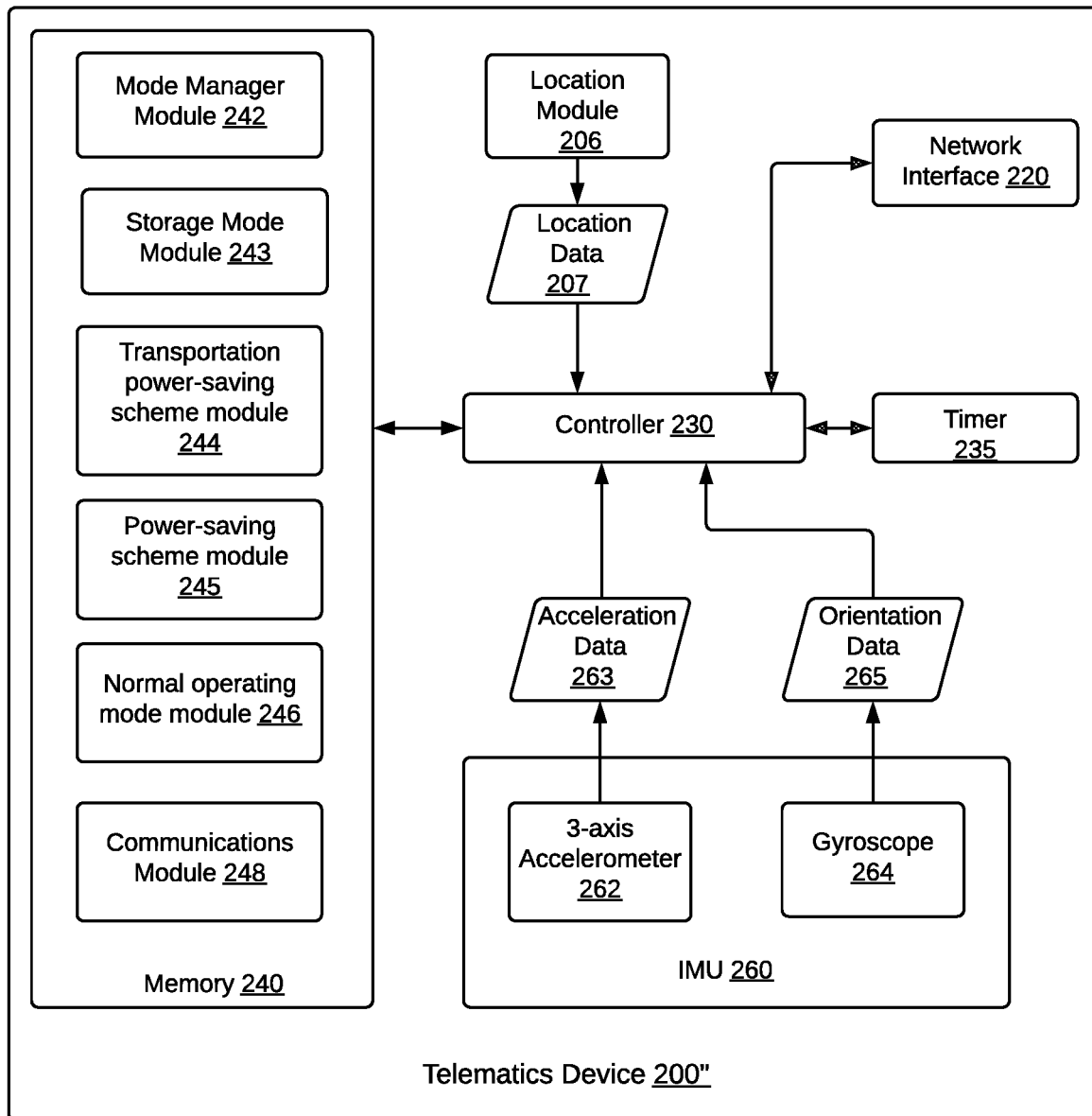
FIG. 6A is a simplified block diagram of a telematics device highlighting the components used to carry out some of the methods of the present disclosure.

In order to better describe the proposed storage mode and the transportation mode power-saving scheme, a simplified block diagram for a telematics device 200" is described with reference to FIG. 6A. The telematics device 200" comprises a location module 206, a telematics device controller 230, a memory 240, a network interface 220, one or more timers 235, and an inertial measurement unit (IMU) 260.

The telematics device controller 230, the location module 206 and the network interface 220 have been described above with reference to FIG. 2.

The timers 235 comprise a plurality of timers. Each timer is an electronic peripheral for providing timer services. A timer of the plurality of timers 235 is typically loaded with a time duration value and then started. Upon the expiration of the time duration, the timer generates an event or a signal that may be used to trigger an action. The timer may be configured as a single-shot timer or as a periodic timer. When configured as a single-shot timer, the timer stops running after the time duration loaded therein elapses. When configured as a periodic timer, the timer starts running again after the time duration elapses. A periodic timer runs indefinitely until explicitly configured to stop. In the depicted embodiment, the timers 235 are shown as a separate module connected to the telematics device controller 230. In other embodiments, the timers 235 may be an internal component of the telematics device controller 230. In either case, the telematics device controller 230 may load one or more of the timers 235 with a duration value, start the timer, and stop the timer 235. Upon expiry, the timer may generate an event such as an interrupt signal and notifies the telematics device controller 230.

The IMU 260 contains a three-axis accelerometer 262 and may also include a gyroscope 264. The IMU 260 may be part of the sensors 204 or a separate component. The three-axis accelerometers 262, may be comprised of three accelerometers in the X-, Y-, and Z-direction. Each of the three accelerometers may be configured to provide sampled acceleration values. A popular implementation of accelerometers uses micro-electromechanical systems (MEMS). In other words, the accelerometers report detected acceleration values a number of times per second. The sampled acceleration values are temporarily saved in first-in-first-out (FIFO) buffers. The telematics device controller 230 may configure the sampling rate at which each of the accelerometers provides acceleration values. Each of the three accelerometers, and accordingly the three-axis accelerometer 262 may be configured to generate a signal if acceleration values exceed a particular threshold. For example, the telematics device controller 230 may configure the three-axis accelerometer 262 to generate an event for any acceleration value greater than 0.5*g, wherein g is the gravitational acceleration valued at approximately 9.81 m/s2. The event generated by the three-axis accelerometer 262 may be an interrupt signal detectable at the telematics device controller 230 and usable to trigger the execution of particular code. The telematics device controller 230 may fetch acceleration data 263 stored in the FIFO buffers of the three-axis accelerometer 262. Accordingly, the telematics device controller 230 may, upon receiving an event, determine acceleration values corresponding to the event and acceleration values preceding the event. The gyroscope 264 provides an orientation indication of the telematics device 200" and accordingly of the asset that the telematics device 200" is installed therein. The gyroscope 264 may also be implemented using MEMS and may have registers storing the orientation data 265 measured by the gyroscope 264. The telematics device controller 230 may obtain orientation data 265 from the gyroscope 264 by reading orientation data from one or more of the registers of the gyroscope 264.

The memory 240 is similar to the memory 240 described with reference to FIG. 2. The memory 240 may store a number of firmware modules each comprised of machine-executable programming instructions which carry out the steps of the methods described in this disclosure. The mode manager module 242 configures the mode of operation of the telematics device 200 based on inputs and conditions. For example, the mode manager module 242 may monitor the status of the vehicle and whether it is on or off, and accordingly transitions the telematics device 200 to either a normal operating mode or a power-saving scheme. Similarly, the mode manager module 242 transition the telematics device 200 to storage mode based on a condition or a received command. Additionally, the mode manager module 242 may transition the telematics device 200 to a transportation mode power-saving scheme based on a condition or a received command. The storage mode module 243 defines the behavior of the telematics device 200 while the telematics device 200 is configured in the storage mode. The transportation mode power-saving scheme module 244 defines the behavior of the telematics device 200 while the telematics device 200 is configured in the transportation mode power-saving scheme. The power-saving scheme module 245 defines the behavior of the telematics device 200 when the telematics device is executing the power-saving scheme 600A of FIG. 5A. The normal operating mode module 246 defines the behavior of the telematics device 200 when the telematics device is configured in the normal operating mode. The communications module 248 allows the other modules to exchange data with the telematics server 300 over the network interface 220. While the firmware modules are shown to reside in the memory 240, they may also reside on an internal memory of the telematics device controller 230 or an external memory connected to the telematics device 200. Other software module are not shown for simplicity. For example, the telematics device 200 may also have an operating system, device drivers, and user interface modules.

In operation, the telematics device controller 230 executes any one of the firmware modules 242, 243, 244, 245, 246, and 248 and control the behavior of the telematics device 200 based on inputs and conditions. Specifically, the telematics device controller 230 utilizes the timers 235 to control sleep and wake durations. The telematics device controller 230 may configure the three-axis accelerometer with a particular acceleration threshold so the three-axis accelerometer may notify the telematics device controller when such a threshold has been exceeded. The telematics device controller 230 may read acceleration data 263 from the three-axis accelerometer 262 and orientation data 265 from the gyroscope 264. The telematics device controller 230 may use the acceleration data 263 and orientation data 265 to change the mode the telematics device 200 is operating in. The telematics device controller 230 may also utilize the location data 207 to alter either the mode the telematics device 200 is operating in or a length of a sleep duration, for example. This will all be explained in further detail below with reference to the operation of both the storage mode and the transportation mode power-saving scheme.

Storage Mode

A storage mode for a telematics device 200 coupled to a stored asset, such as a vehicle is described, in accordance with embodiments of the present disclosure. In the storage mode, the telematics device 200 disables all activity and remains in sleep mode. Furthermore, the telematics device 200 does not conduct any periodic wake-up activities or location updates while it is configured in the storage mode. Exiting the storage mode configures the telematics device 200 in normal operation mode or a power-saving scheme depending on whether the vehicle in which the telematics device 200 is installed is on or off.

In some embodiments, the storage mode for the telematics device 200 is enabled (or entered) upon reception of a storage mode enablement command from the telematics server 300. In other embodiments, the storage mode may be automatically enabled when the telematics device has been executing a power-saving scheme for an extended period of time that exceeds a storage mode duration threshold. For example, with reference to FIG. 5A, the telematics device 200 may enter storage mode if the telematics device 200 has been in the second stage for the power-saving scheme 600A more than a storage mode duration threshold. This will be explained further below with reference to FIG. 5B.

The telematics device 200 exits (or disables) storage mode based on one of a plurality of conditions. The telematics device 200 may exit the storage mode upon the detection of the vehicle being turned on. The detection of the vehicle being turned on may be in the form of an electric signal change on the interface port 102 of the vehicle. The telematics device 200 may also exit the storage mode in response to detecting motion that meets certain conditions.

Figure 5B:
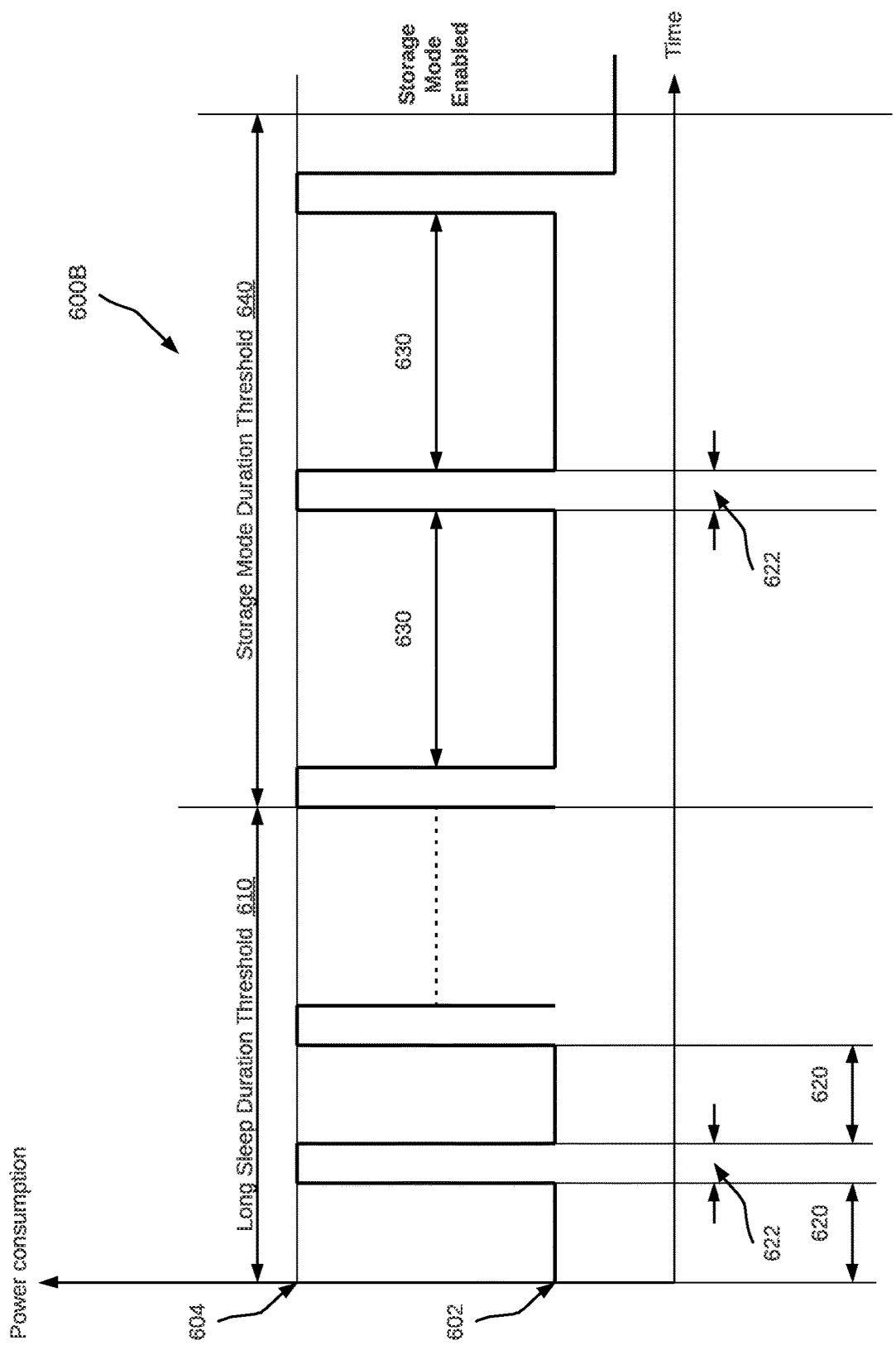
FIG. 5B is a graph showing a modified version of the power-saving scheme of FIG. 5A allowing automatic transitioning into a storage mode, in accordance with embodiments of the present disclosure.

FIG. 5B illustrates a modified power-saving scheme 600B which allows storage mode to be enabled automatically when the telematics device 200 has exceeded a storage mode duration threshold, in accordance with embodiments of the present disclosure. The power-saving scheme 600B is similar to the power-saving scheme 600A in that it features a shorter sleep duration 620 at the outset, and switches to a longer sleep duration 630 after a long sleep duration threshold 610 has been exceeded. The modified power-saving scheme 600B additionally transitions the telematics device 200 to the storage mode, if the telematics device is in the second stage (which is characterized by the longer sleep durations 630) of the power-saving scheme 600B for a duration that is longer than a storage mode duration threshold 640.

Figure 6B:
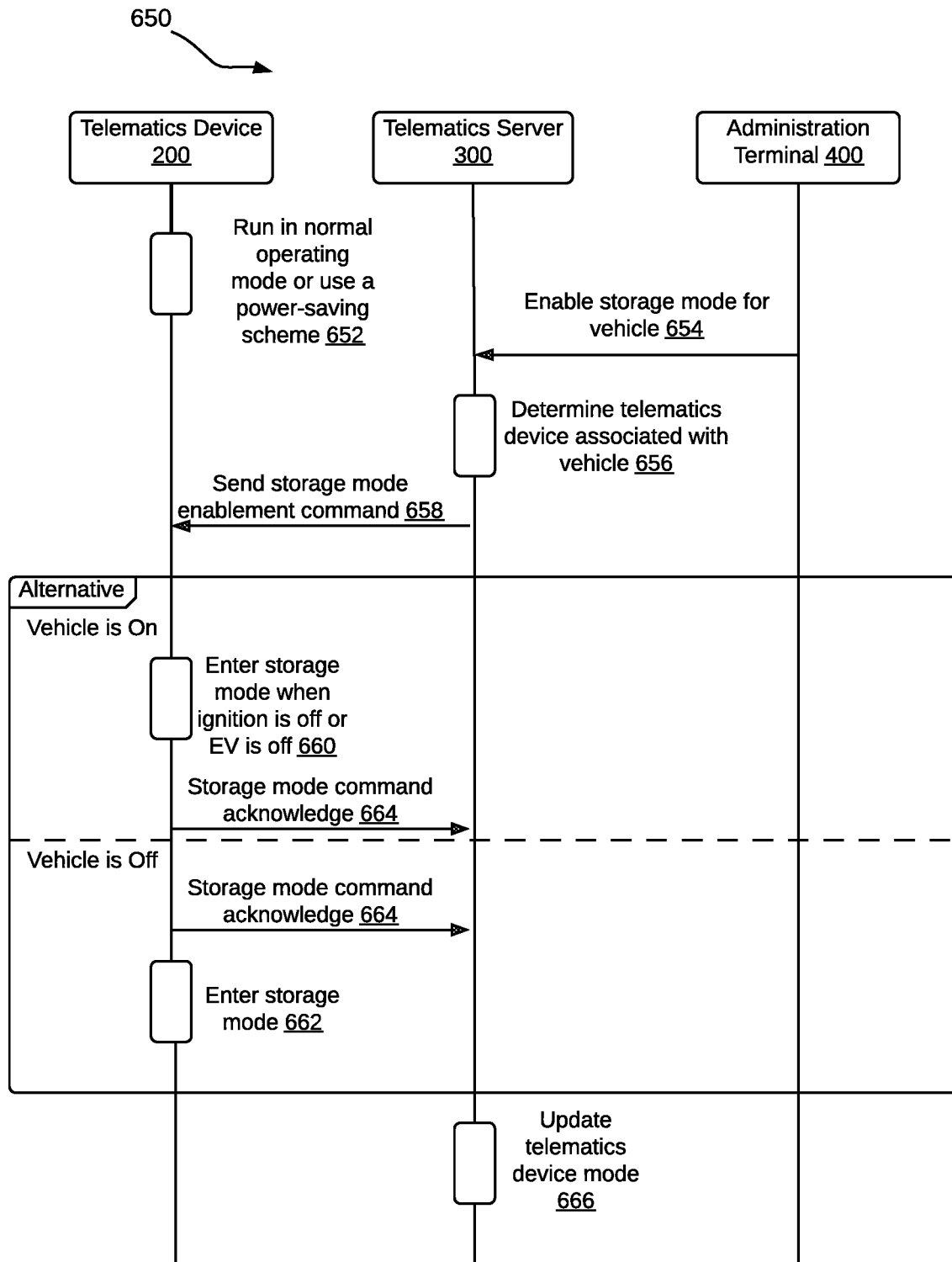
FIG. 6B is a message sequence diagram illustrating enabling a storage mode of the telematics device based on user input on an administration terminal, in accordance with embodiments of the present disclosure.

The storage mode may be enabled by sending a storage mode enablement command to the telematics device. FIG. 6B is a message sequence diagram illustrating a method 650 in which a telematics device 200 enters storage mode in response to a storage mode enablement command, in accordance with embodiments of the present disclosure.

At step 652, the telematics device 200 runs in normal operating mode or uses a power-saving scheme, such as the power-saving scheme 600A (or the modified power-saving scheme 600B of FIG. 5B).

At step 654, the administration terminal 400 sends a message to the telematics server 300 designating a particular asset to be in storage. The administration terminal 400 may send the message in response to input by a fleet manager 20 designating the vehicle as being in storage.

At step 656, the telematics server 300 receives the message designating the particular asset to be put in storage from the administration terminal 400. The telematics server 300 consults the telematics database 310 to determine the telematics device 200 associated with the particular asset.

At step 658, the telematics server 300 sends a storage mode enablement command to the telematics device 200. The storage mode enablement command is received by the telematics device 200. If the telematics device 200 is in a fully operational mode, the storage mode enablement command is received in real-time. If the telematics device 200 is executing a power-saving scheme, then the storage mode enablement command is received during the next scheduled wake-up duration 622.

In response to receiving the storage mode enablement command, the telematics device 200 checks whether the vehicle is on or off. If the vehicle is on, then at step 660 the telematics device 200 defers entering storage mode until the vehicle is turned off. For example, a flag may be set indicating that the telematics device 200 is to enter storage mode upon detecting that the vehicle has been turned off. If upon receiving the storage mode enablement command the vehicle is off, then at step 662 the telematics device 200 enters storage mode.

At step 664, the telematics device 200 sends a storage mode command acknowledgement to the telematics server. This step is carried out as the telematics device 200 is entering storage mode and before it powers down the network interface 220.

At step 666, the telematics server 300 updates the status of the telematics device 200 in the telematics database 310 indicating that the telematics device 200 is in storage mode.

The method 650 illustrated by the message sequence diagram of FIG. 6B requires that a user such as a fleet manager 20 indicate, using an administration terminal 400, when a particular vehicle is in storage.

Figure 7:
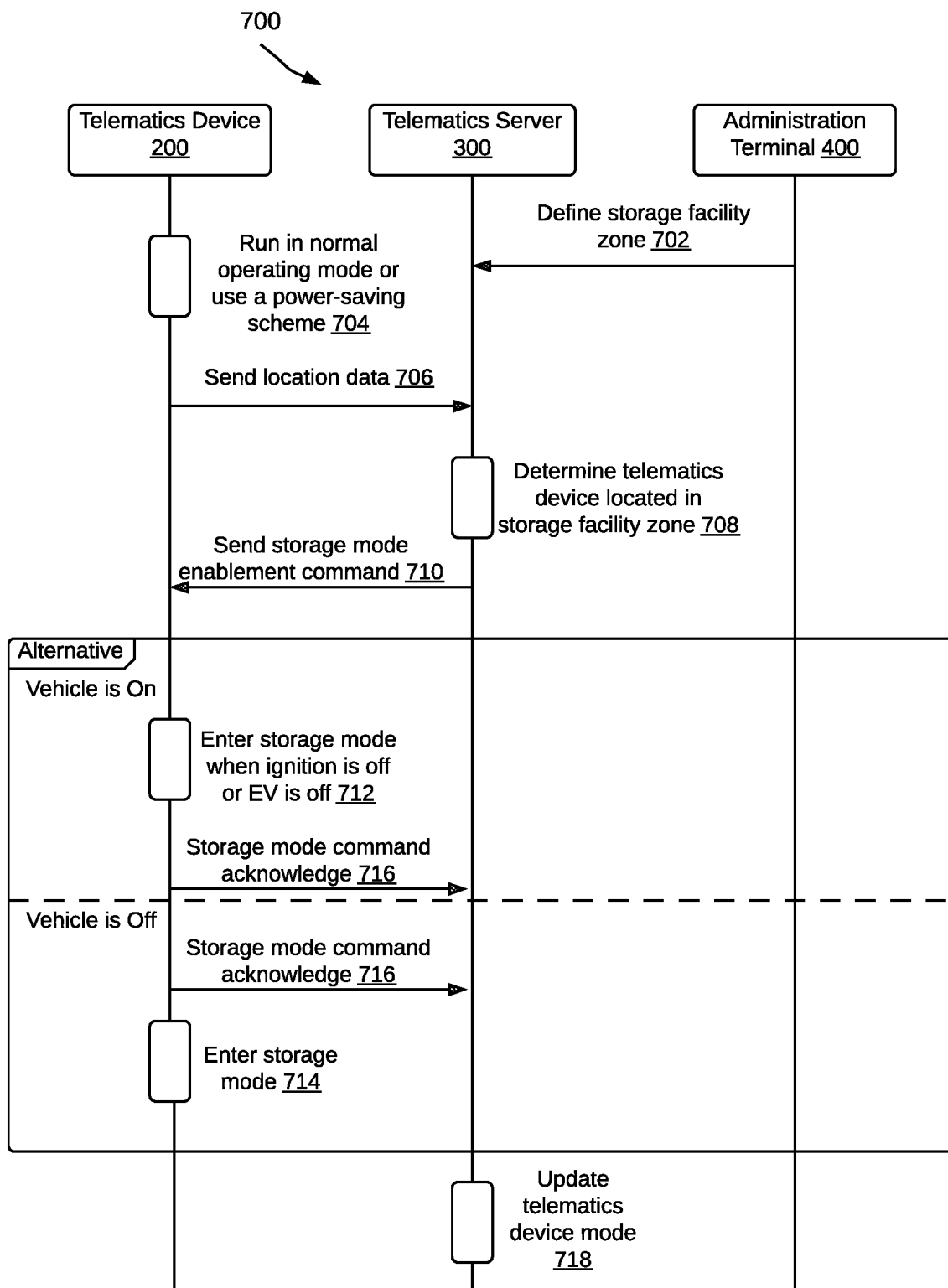
FIG. 7 is a message sequence diagram illustrating location-based enabling of the storage mode of the telematics device, in accordance with embodiments of the present disclosure.

Determining that a particular vehicle is in storage may also be determined by the location of the vehicle in relation to predefined zones designated as storage facilities. FIG. 7 is a message sequence diagram depicting a method 700 in which a telematics device 200 enters storage mode based on the vehicle coupled thereto being in a zone designated as a storage facility.

At step 702, the administration terminal 400 sends a message to the telematics server 300 defining a storage facility zone. For example, with reference to FIG. 8, there is shown a map portion 800 in which a storage facility zone 820 is defined by a geofence 810. A fleet manager 20 may define the storage facility zone 820 using the administration terminal 400 or otherwise.

At step 704, the telematics device 200 runs in normal operating mode or uses a power-saving scheme, as described above with reference to step 652.

At step 706, the telematics device 200 sends location data 207 to the telematics server 300 indicating the location of the vehicle to which the telematics device 200 is coupled.

Figure 8:
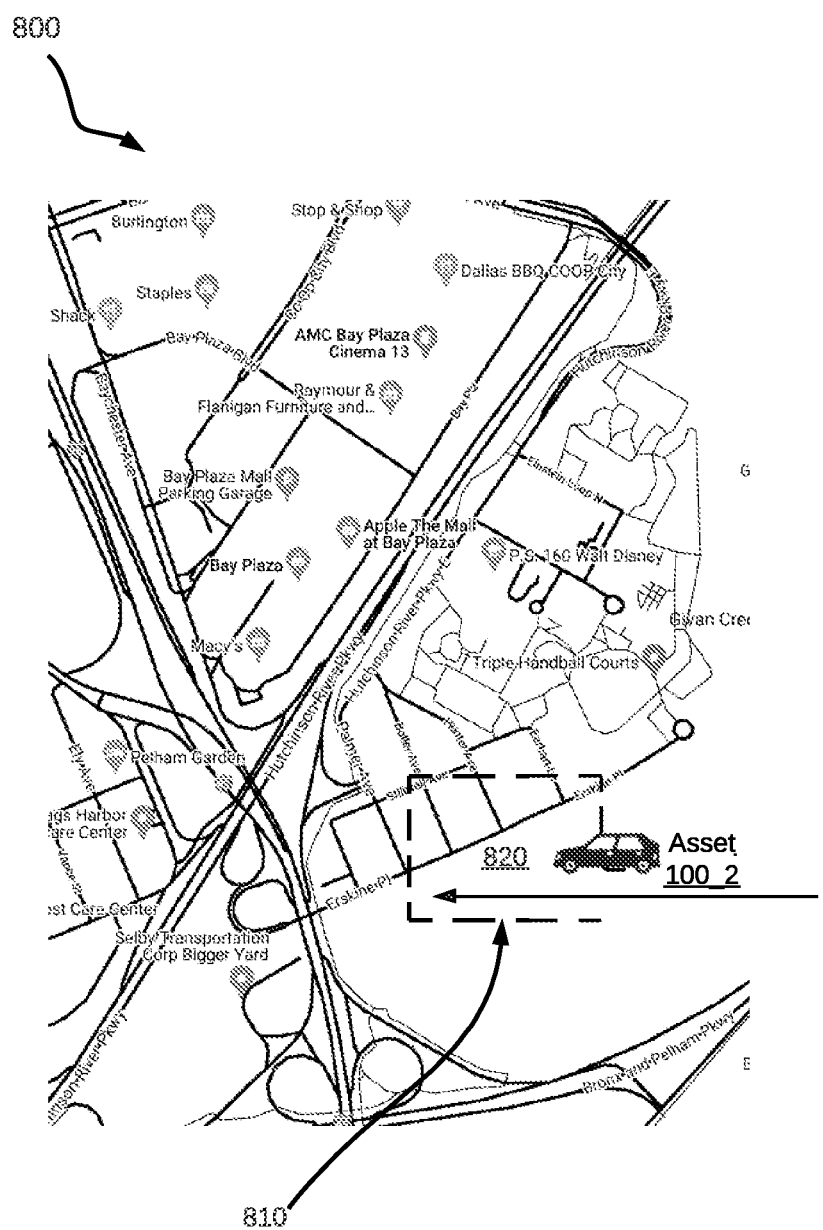
FIG. 8 illustrates an asset entering a zone defined by a geofence on a map.

At step 708, the telematics server 300 determines whether the location data 207 reported by the telematics device 200 indicate that the vehicle, such as the asset 100_2 in FIG. 8 is located inside a storage facility zone 820.

If the telematics server 300 determines that the vehicle is in the storage facility zone 820, then at step 710, the telematics server sends a storage mode enablement command to enable the storage mode on the telematics device 200, in a manner similar to that of step 658 of FIG. 6B.

Steps 712, 714, 716, and 718 are similar to steps 660, 662, 664, and 666, respectively. Accordingly, these steps are not described again for brevity.

In some embodiments (not shown), a newly deployed telematics device 200 runs a default firmware with a default configuration. At some point, a firmware update is delivered to the telematics device 200 by the telematics server 300. The firmware update may include configuration parameters among which is a parameter set to enable the storage mode.

The telematics device 200 remains in storage mode unless a trigger is detected which causes the telematics device to exit storage mode. While in storage mode, the telematics device 200 cannot determine the location thereof as the location module 206 is turned off. Furthermore, the telematics device 200 cannot receive any commands from the telematics server 300, such as a command to disable storage mode. One possible trigger for exiting the storage mode is detecting that the vehicle to which the telematics device 200 is coupled has been turned on. Detecting that the vehicle has been turned on may comprise detecting a voltage change on one pin of the interface port 102 indicating activity on the CAN bus 150 from one or more ECU 110. While activity on the CAN bus 150 may not necessarily indicate an ignition, the telematics device 200 may enter the fully operational mode to check further activity on the CAN bus 150 including detecting whether the vehicle has been turned on. If the telematics device 200 determines that the vehicle is off, then the telematics device 200 may either return to storage mode or run a power-saving scheme. In some embodiments, if the vehicle is turned on for a brief period of time, the telematics device 200 returns to storage mode when the vehicle is turned off. If the vehicle is turned on for a longer period of time, such as for a few minutes, then the telematics device 200 does not return to the storage mode when the vehicle is turned back off. Instead, the telematics device 200 runs a power-saving scheme.

Another possible trigger for taking the telematics device 200 out of storage mode is the detection of motion. As discussed above, the telematics device 200 may be configured to wake up from sleep mode based on motion detected by a motion sensor, such as a three-axis accelerometer 262. In some embodiments, the motion detected has to exceed a particular threshold and persist for a particular duration in order to cause the telematics device 200 to exit the storage mode. This will be explained further below.

Storage mode may also be automatically disabled if a storage mode expiry duration has elapsed. For example, the storage mode enablement command sent by the telematics server 300 to the telematics device 200 may include a set duration for the storage mode. Accordingly, the telematics device 200 may configure a timer of the timers 235 to wake up the telematics device 200 and exit storage mode when the timer, which is configured to expire after the storage mode expiry duration, has expired.

Figure 9:
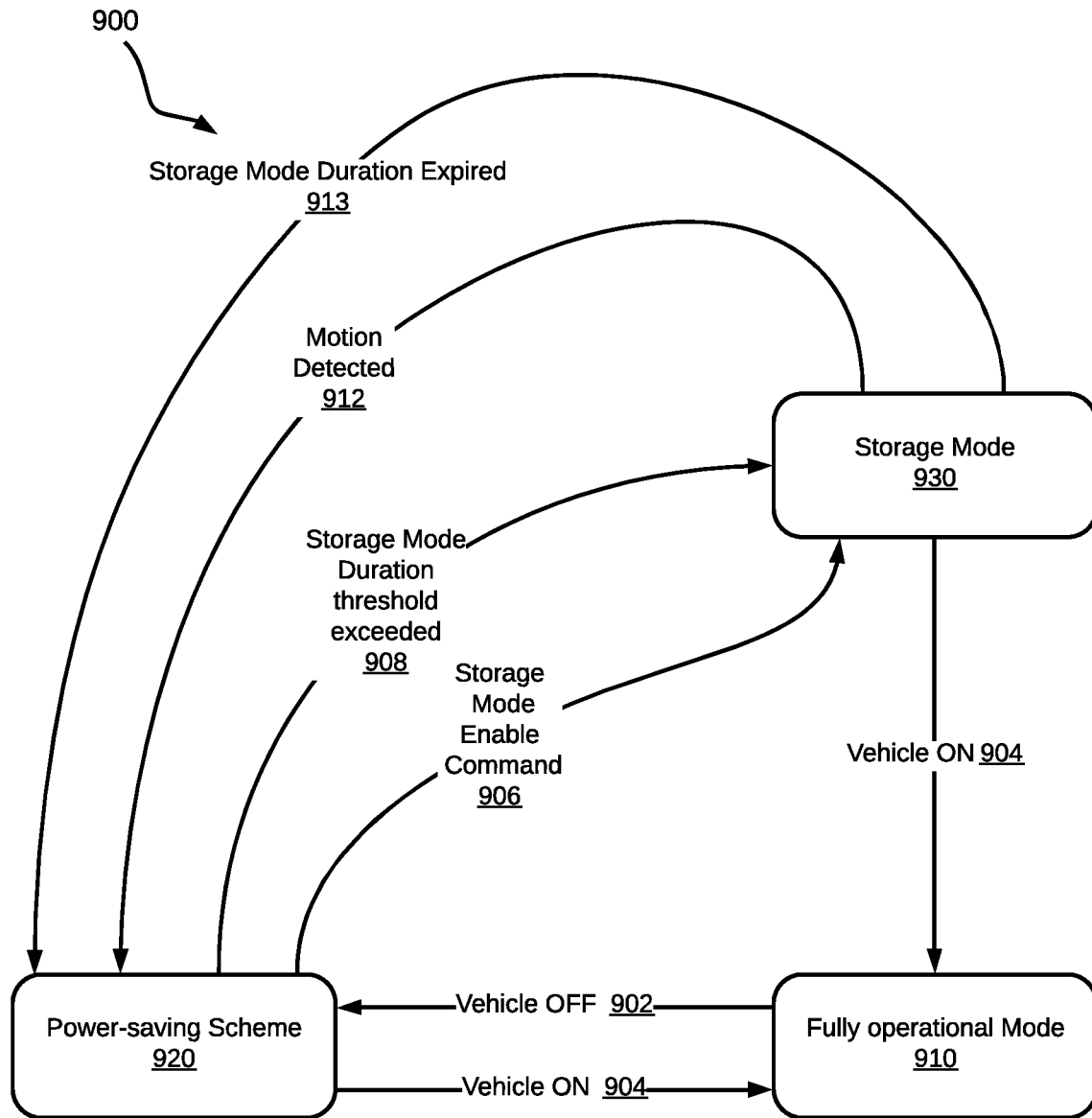
FIG. 9 is a state chart showing transitions to and from a storage mode of the telematics device, in accordance with embodiments of the present disclosure.

FIG. 9 depicts a state diagram 900 showing the various state transitions relating to the storage mode. A telematics device 200 may operate in the fully operational mode 910 when the vehicle is on. If the telematics device 200 detects a vehicle off event 902, the telematics device 200 runs a power-saving scheme 920. The power-saving scheme 920 may be the power-saving scheme 560B of FIG. 5B. If a storage mode enablement command event is detected while the telematics device 200 is running the power-saving scheme 920, the telematics device 200 transitions to the storage mode 930. As discussed earlier, the command to enable storage mode may be received by the telematics device 200 when it is in fully operational mode. However, the telematics device 200 does not transition from a fully operational mode 910 to a storage mode 930. Instead, the telematics device 200 may buffer the storage mode enablement command and acts on it upon entering the power-saving scheme 920.

While running the power-saving scheme 920, the telematics device 200 may transition to storage mode 930 in response to a storage mode enablement command 906, in accordance with some embodiments of the present disclosure. The storage mode enablement command may have been received by the telematics device 200 while in fully operational mode 910 and buffered, or it may be received during one of the wake-up durations of the power-saving scheme 920. As discussed earlier, the storage mode enablement command may be triggered by the telematics server 300 based on a message from an administration terminal or based on a determination that the telematics device 200 and the vehicle coupled thereto are in a storage zone, i.e., a zone corresponding to a storage facility.

In some embodiments, the telematics device 200 may transition from the power-saving scheme 920 to the storage mode 930 in response to being in the long-sleep stage of the power-saving scheme for a period that is greater than a storage mode duration threshold 640, i.e., when the duration of the long-sleep stage of the power-saving scheme exceeds the storage mode duration threshold 640. This transition is represented by the transition 908 in FIG. 9.

Figure 10:
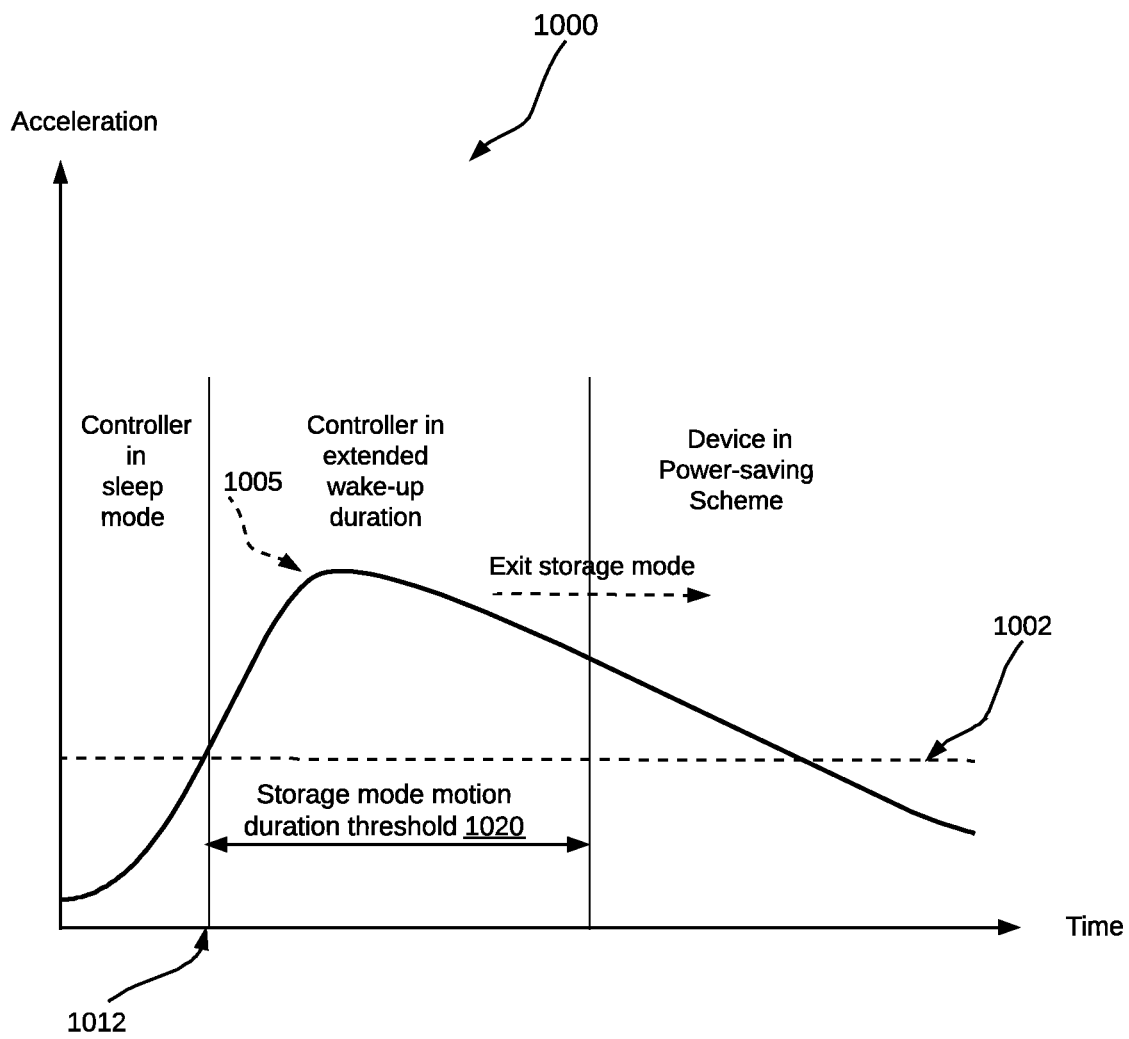
FIG. 10 is a graph showing an acceleration profile by a sensor of the telematics device during transitioning out of storage mode, in accordance with embodiments of the present disclosure.

While the telematics device 200 is in storage mode 930, the telematics device 200 may transition back to the power-saving scheme 920 in response to a motion detection event 912. For example, motion sensors, such as the three-axis accelerometer 262 on the telematics device 200 may be configured to generate a signal such as an interrupt signal that causes the telematics device controller 230 to wake up and run at full speed. The telematics device 200 may then monitor the acceleration data 263 reported by the accelerometers to determine whether the motion detected by the accelerometer is consistent with motion of the vehicle. For example, an acceleration value above a first threshold and for a first duration may cause the telematics device 200 to transition from the storage mode to the power-saving scheme 920. This is illustrated in FIG. 10 and explained further below.

Alternatively, or additionally, a vehicle on event 904 causes the telematics device 200 to transition from the storage mode 930 to the fully operational mode 910. The vehicle on event may be in the form of a voltage level change on a pin of a connector of the interface port 102, such as an OBD-II port.

Alternatively, or additionally, the storage duration in which the telematics device 200 needs to be in the storage mode 930 may be known in advance. For example, if a vehicle is to be stored for 10 days, the telematics device 200 may configure a timer to expire after 10 days. In this embodiment, the telematics device 200 is configured to be in sleep mode and to wake up from sleep upon the expiry of the timer. For example, the telematics device controller 230 of the telematics device 200 may be configured to wake up upon receiving a timer interrupt which is triggered when the timer expires after the storage duration has elapsed. A timer expiry event 913 is shown in FIG. 9 as one possible event that causes the telematics device to transition from the storage mode 930 to the powers-saving scheme 920.

Exiting the storage mode based on motion detection comprises configuring at least one accelerometer of the telematics device 200 to wake up the telematics device controller 230 when measured acceleration by the at least one accelerometer exceeds a first threshold. FIG. 10 is a graph 1000 illustrating an acceleration profile as measured by an accelerometer of a telematics device 200 as the vehicle coupled to the telematics device 200 moves from a stored mode. The vertical axis of the graph 1000 represents instantaneous acceleration measured by an accelerometer of the telematics device 200. The horizontal axis represents time. In some embodiments, the telematics device 200 has a three-axis accelerometer and the acceleration represented by the vertical axis is the resultant (root mean square) of the acceleration measured by all three orthogonal accelerometers of the three-axis accelerometer 262. A first acceleration threshold 1002 represents noise acceleration levels that may be measured by the accelerometer of the telematics device 200 if the vehicle to which the telematics device 200 is coupled undergoes minor movement without being in motion.

FIG. 10 shows an acceleration profile 1005 detected over a period of time from the acceleration data 263 while the telematics device 200 is in storage mode. The acceleration profile portion before the time 1012 is below the first acceleration threshold 1002 and is therefore ignored by the telematics device 200. As the acceleration profile 1005 exceeds the first acceleration threshold 1002, the telematics device 200 wakes up and starts a timer having an expiry duration equal to a storage mode motion duration threshold 1020. If the acceleration profile 1005 maintains the acceleration value thereof above the first acceleration threshold for the storage mode motion duration threshold 1020, then the telematics device exits the storage mode. If, however, the acceleration profile 1005 drops in value below the 1002 noise level before the expiry of the storage mode motion duration threshold 1020, then the telematics device 200 remains in storage mode and dismisses that portion of the acceleration profile as a transient movement not representative of the motion of the vehicle to which the telematics device 200 is coupled. A transient movement may be experienced if someone sits in a vehicle, pops up the hood, pushes down on the body to test the suspension, or places a heavy item in the trunk of the vehicle. The storage mode motion duration threshold 1020 may be set to several seconds such as 30 seconds or 60 seconds.

Transportation Mode

The three modes discussed thus far which are the fully operational mode 910, the power-saving scheme 920, and the storage mode 930 all serve different purposes. An additional mode is needed to track a vehicle which is being transported and to also capture certain events pertaining to that vehicle during transportation.

In a transportation mode, the telematics device 200 provides location updates at a low rate, such as every few hours. The rate at which the telematics device 200 provides a location update to the telematics server 300 may depend on whether the telematics device 200 has moved since the last location update. In addition to providing a periodic location update, the telematics device 200 detects any sudden motion that is consistent with an impact. In some embodiments, the telematics device may detect and report when an unexpected orientation of the telematics device is detected such as when the asset coupled to the telematics device 200 is flipped upside down or tipped on its side. In some embodiments, the telematics device may report an orientation change consistent with the telematics device 200 being tipped or flipped upside down.

Figure 11:
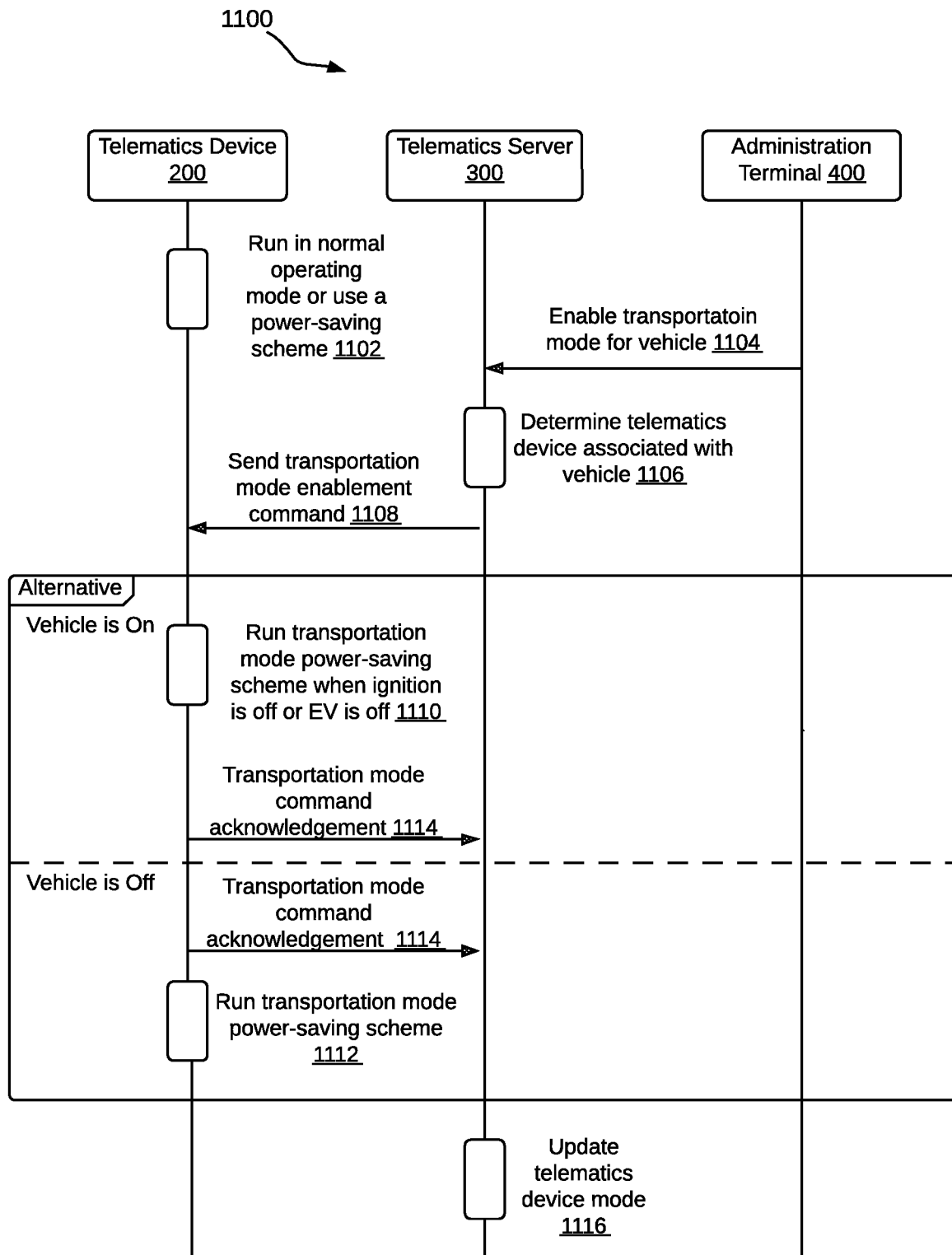
FIG. 11 is a message sequence diagram illustrating enabling a transportation mode power-saving scheme of the telematics device based on user input on an administration terminal, in accordance with embodiments of the present disclosure.

In some embodiments, enabling transportation mode is somewhat similar to enabling storage mode. For example, transportation mode may be enabled by a command sent from the telematics server 300 to the telematics device 200. FIG. 11 is a message sequence diagram showing a method 1100 by which a telematics device 200 enables transportation mode in response to a command, in accordance with embodiments of the present disclosure. Due to the similarities between the method 1100 and the method 650, brief descriptions of the steps are provided below.

At step 1102, the telematics device 200 is running in normal operating mode or using a power-saving scheme. At step 1104, the administration terminal 400 sends a message to the telematics server indicating that transportation mode needs to be enabled for a particular vehicle. At step 1106, the telematics server 300 receives the message and determines the telematics device 200 coupled to the particular vehicle. At step 1108, the telematics server 300 sends a transportation mode enablement command to the telematics device 200. If the vehicle is on (i.e., the ignition is on or the EV is in enabled mode), then at step 1110 the telematics device 200 buffers the command and configures itself to enable the transportation mode power-saving scheme as soon as the vehicle is turned off. Conversely, if the vehicle was already off, then at step 1112, the telematics device 200 enables the transportation mode power-saving scheme upon receiving the transportation mode enable command.

At step 1114, the telematics device 200 sends a transportation mode command acknowledgement to indicate to the telematics server 300 that the telematics device 200 is running a transportation mode power-saving scheme. At step 1116, the telematics server 300 updates the status of the telematics device 200 to indicate that the telematics device 200 is running a transportation mode power-saving scheme.

Figure 12:
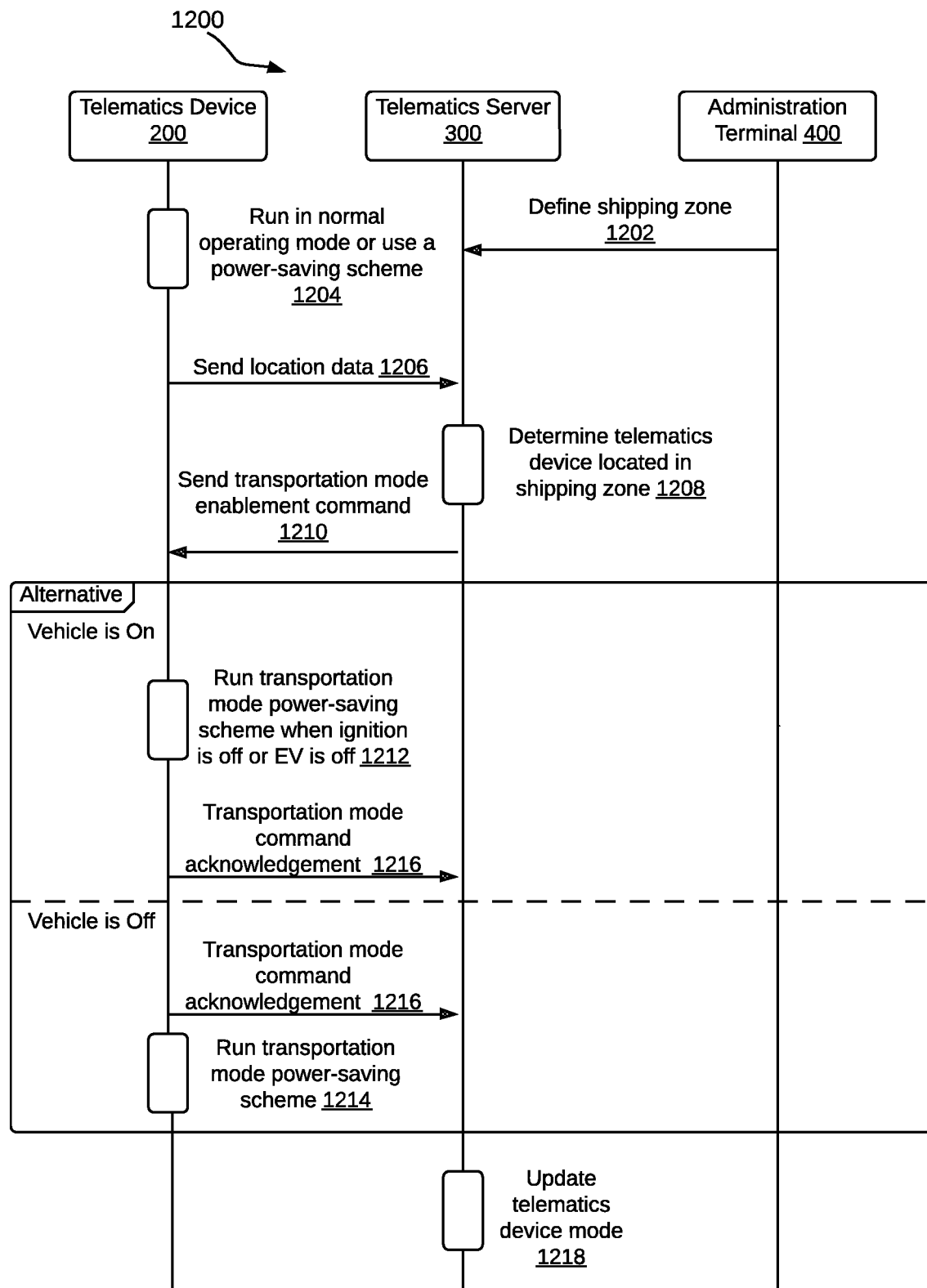
FIG. 12 is a message sequence diagram illustrating location-based enabling of the transportation mode power-saving scheme of the telematics device, in accordance with embodiments of the present disclosure.

In some embodiments, transportation mode power-saving scheme is enabled automatically based on the location data 207 reported by the telematics device 200 to the telematics server 300. For example, if the location data 207 indicates that the vehicle to which the telematics device 200 is coupled is located in a shipping zone such as a shipping dock at a harbor or at a train station, then the telematics server 300 may send a transportation mode enable command to the telematics device 200. With reference to FIG. 12, there is shown a sequence diagram depicting a method 1200 for enabling transportation mode on a telematics device 200 based on location data, in accordance with embodiments of the present disclosure. The method 1200 is somewhat similar to the method 700 of FIG. 7. Accordingly, only brief descriptions of the steps thereof are provided below.

At step 1202, a shipping zone is defined on a map, via a message from the administration terminal 400. The shipping zone is a starting point for transporting the vehicle or asset to which the telematics device 200 is coupled. The shipping zone may be a shipping dock location at a harbor, a trucking station, or a train station for example.

At step 1204, the telematics device 200 is running either in the fully operational mode or using a power-saving scheme.

At step 1206, the telematics device 200 sends location data 207 indicating the location thereof and of the asset the telematics device 200 is coupled thereto to the telematics server 300.

At step 1208, the telematics server 300 determines that the location of the telematics device 200 as represented in the location data 207 places the telematics device 200 and the asset 100 coupled thereto in a shipping zone.

At step 1210, based on the determination made in step 1208, the telematics server 300 sends transportation mode enablement command to the telematics device 200.

The handling of the transportation mode enablement command at the telematics device 200 depends on whether the asset (e.g., vehicle) to which the telematics device 200 is coupled is turned on or off.

If the vehicle is on, then at step 1212 the transportation mode enablement command is buffered or stored on the telematics device 200 and queued until the vehicle is turned off. When the vehicle is turned off, then the transportation mode enablement command is processed and the telematics device 200 enters and is configured to work in the transportation mode power-saving scheme.

If the vehicle is off, then at step 1214 the telematics device 200 enters the transportation mode power-saving scheme in response to receiving the transportation mode enablement command.

At step 1216, a transportation mode command acknowledgement is sent by the telematics device 200 to the telematics server 300.

At step 1218, the telematics server 300 updates the telematics device 200 mode, for example in the telematics database 310.

In some embodiments (not shown), a newly deployed telematics device 200 runs a default firmware with a default configuration. At some point, a firmware update is delivered to the telematics device 200 by the telematics server 300. The firmware update may include configuration parameters among which is a parameter to enable the transportation mode power-saving scheme.

Figure 13:
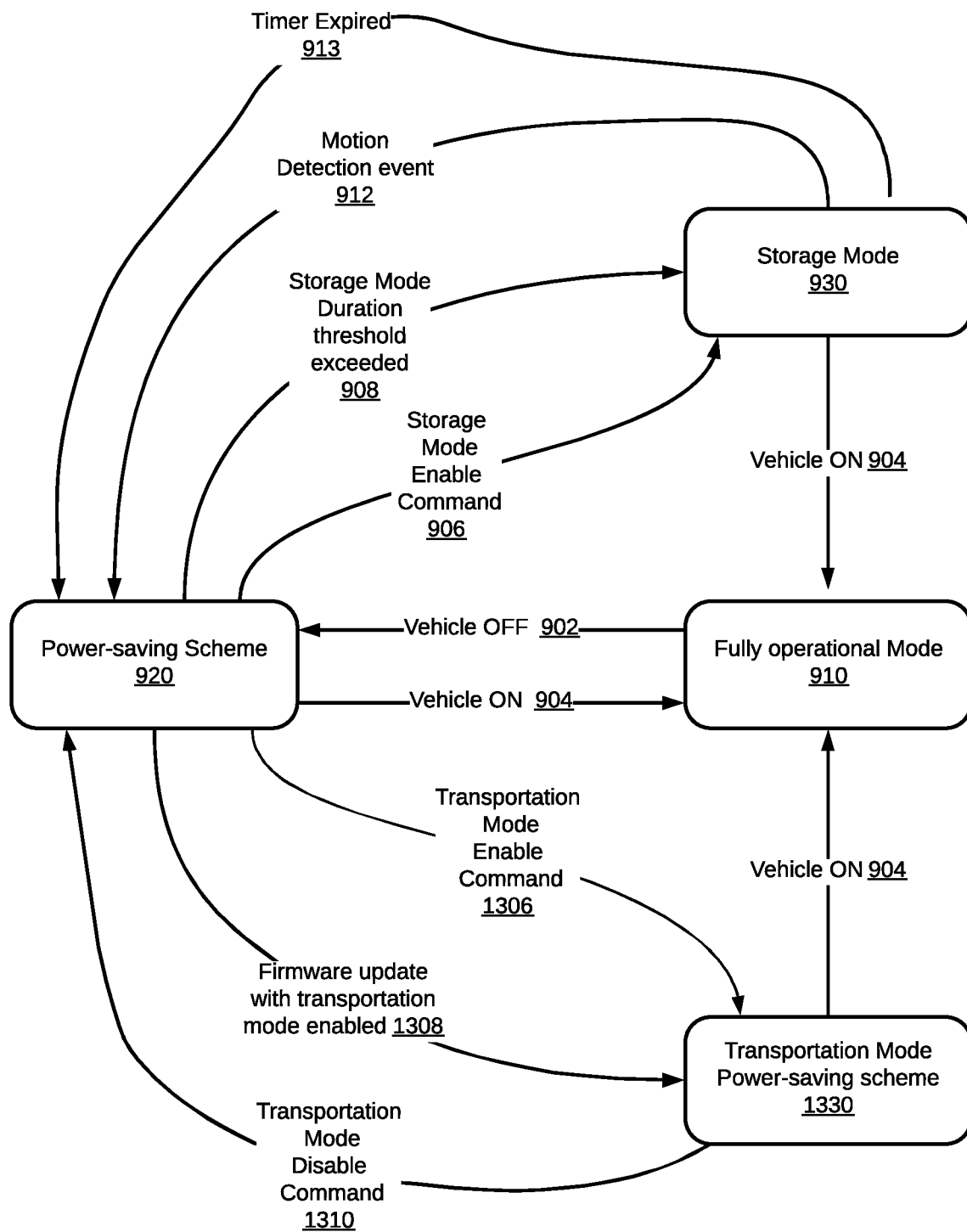
FIG. 13 is a state chart showing transitions to and from both the storage mode and the transportation mode power-saving scheme, in accordance with embodiments of the present disclosure.

FIG. 13 is a state diagram illustrating the transitions between the fully operational mode 910, the power-saving scheme 920, the storage mode 930, and the transportation mode power-saving scheme 1330, in accordance with embodiments of the present disclosure. The transitions relating to the storage mode 930 have already been discussed in FIG. 9 and will not be repeated for the sake of brevity.

When the telematics device is running a power-saving scheme 920 and receives a transportation mode enable command 1306, the telematics device 200 transitions to the transportation mode power-saving scheme 1330. The transportation mode enable command 1306 may have been received from the telematics server 300 while the telematics device 200 is running the power-saving scheme 920 or may have been received earlier while the telematics device 200 was in the fully operational mode 910 and queued until the telematics device 200 is running the power-saving scheme.

In some cases, the telematics device 200 receives a firmware update for one or more of the software modules running by the telematics device controller 230 thereof. Firmware updates cannot be installed until the vehicle is off and is in a power-saving scheme 920 so that the firmware update does not cause loss of asset data 112 from the vehicle. Accordingly, a firmware update while the vehicle is off, i.e., when the telematics device 200 is in a power-saving scheme 920. When the telematics device 200 receives a firmware update containing a parameter that enables transportation mode, shown as event 1308, then the telematics device 200 transitions to the transportation mode power-saving scheme 1330.

When the telematics device 200 is in the transportation mode power-saving scheme 1330 it may transition out of the transportation mode power-saving scheme 1330 and into a fully operational mode in response to a vehicle on event 904.

The telematics device 200 may exit the transportation mode power-saving scheme 1330 in response to receiving a transportation mode disable command, shown as the event 1310, from the telematics server 300.

In some embodiments, while in the transportation mode power-saving scheme 1330, the telematics device 200 changes the sleep duration thereof depending on whether the location of the telematics device 200 has changed from a previous location. This is illustrated with reference to FIG. 14 which shows a graph of a transportation mode power-saving scheme 1400 depicting power consumption versus time as the telematics device 200 runs in accordance with a transportation mode power-saving scheme 1330.

Figure 14:
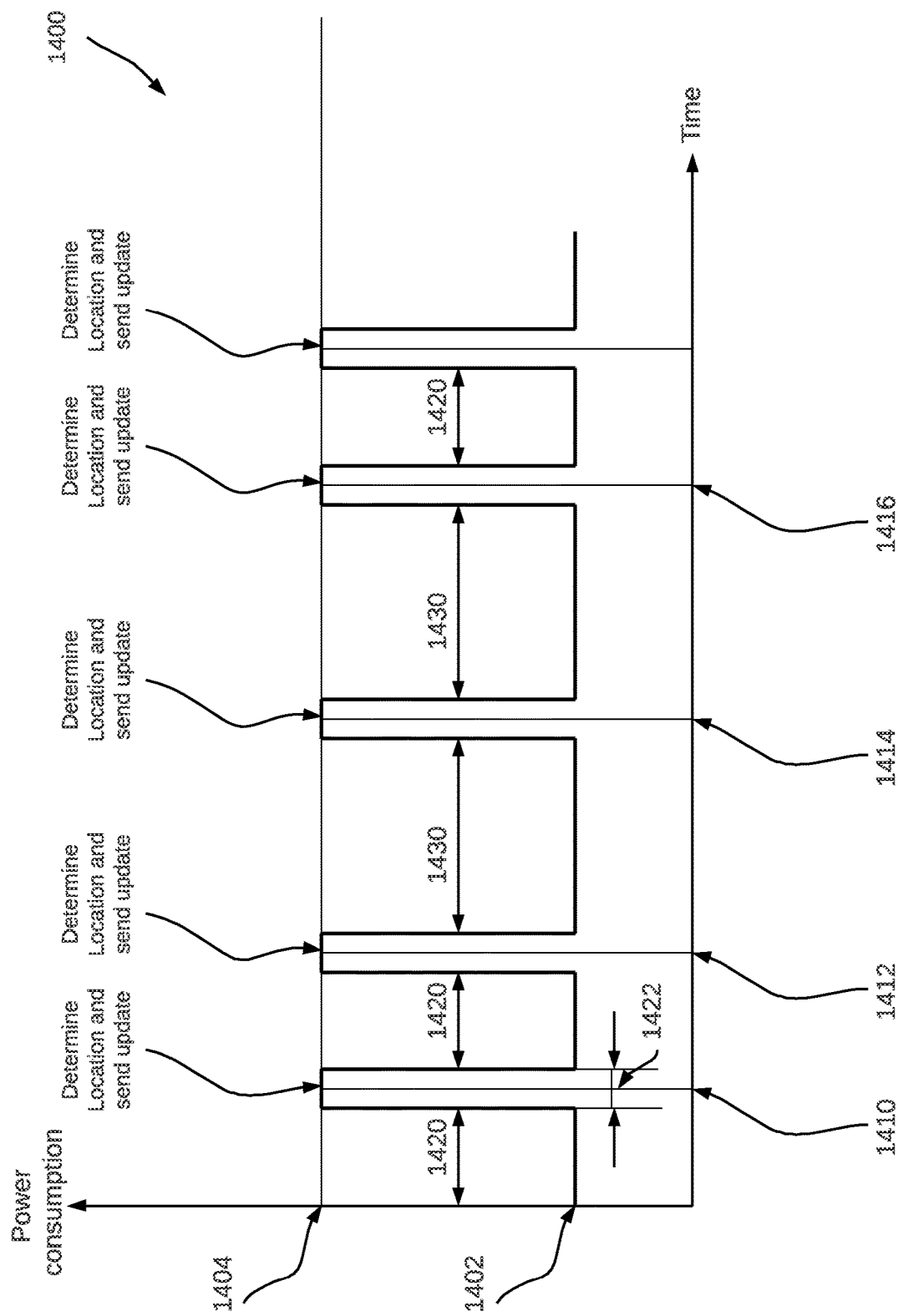
FIG. 14 is a graph showing the power consumption of the telematics device versus time during a transportation mode power-saving scheme, in accordance with embodiments of the present disclosure.

With reference to FIG. 14, The vertical axis represents the power consumption of the telematics device 200 while the horizontal axis represents time. The sleep power consumption level 1402 represents the transportation mode power-saving scheme power consumption of the telematics device 200 while in a sleep duration of the transportation mode power-saving scheme 1330. The sleep power consumption level 1402 may be the same as or different from the sleep power consumption level 602 of the sleep duration of the power-saving schemes 600A and 600B. For example, if the same number of peripherals are powered off during the sleep duration of both the power-saving schemes 600A and 600B, and the transportation mode power-saving scheme 1330, then the sleep power consumption level 1402 is equal to the sleep power consumption level 602. If fewer peripherals are powered off during the sleep duration of the transportation mode power-saving scheme 1330, then the sleep power consumption level 1402 is higher than the sleep power consumption level 602. The sleep power consumption level 1402 may be the same, lower than, or higher than the power consumption of the telematics device while in the storage mode 930 again depending on the number of peripherals which are powered during the sleep duration.

The first wake-up power consumption level 1404 represents the transportation mode power-saving scheme power consumption level of the telematics device 200 when the telematics device 200 is in a wake-up duration 1422 of the transportation mode power-saving scheme 1330. The first wake-up power consumption level 1404 may be the same or different from the wake-up power level 604 of the sleep duration of the power-saving scheme 600A (or the power-saving scheme 600B) depending on the number of peripherals which are enabled when the telematics device 200 wakes up and is in a wake-up duration 622. In the depicted transportation mode power-saving scheme 1400, the telematics device 200 always sends a location update when it is in the wake-up duration 1422. Accordingly, during the wake-up duration 1422 the telematics device powers up the location module 206 to obtain location data 207 and powers up the network interface 220 to send the location data 207 to the telematics server 300. Accordingly, the first wake-up power consumption level 1404 of the telematics device 200 during the wake-up duration 1422 is substantially the same for all wake-up durations 1422.

The transportation mode power-saving scheme 1400 may vary the sleep duration between consecutive wake-up durations based on location change. If the location data 207 determined at two successive wake-up durations is substantially the same, then the telematics device 200 sleeps for longer sleep duration 1430 until the next wake-up duration 1422. Conversely, if the location data 207 determined at two successive wake-up durations is substantially different, then the telematics device sleeps for a shorter sleep duration 1420. This is illustrated in FIG. 14. At the time 1410, the telematics device 200 determines the location thereof, goes back to sleep for a shorter sleep duration 1420, which may be the default or initial sleep duration at startup. At time 1412, the telematics device 200 wakes up and again determines its location. The telematics device 200 compares the first location determined at the time 1410 and the second location determined at the time 1412. If the second location is the same as the first location, the telematics device 200 sleeps for a longer sleep duration 1430 until the next wake-up duration. The longer sleep duration 1430 remains the current sleep duration for the transportation mode power-saving scheme 1400 until two successive locations are different. For example, at time 1414, the location determined is the same as the location determined at the time 1412, so the telematics device 200 goes to sleep for another longer sleep duration 1430. At time 1416, the location determined is different from the location determined at the time 1414. In response to determining that the location determined at the time 1416 is different from the location determined at the time 1414, the telematics device 200 switches to the shorter sleep duration and goes to sleep for the shorter sleep duration 1420.

Figure 15:
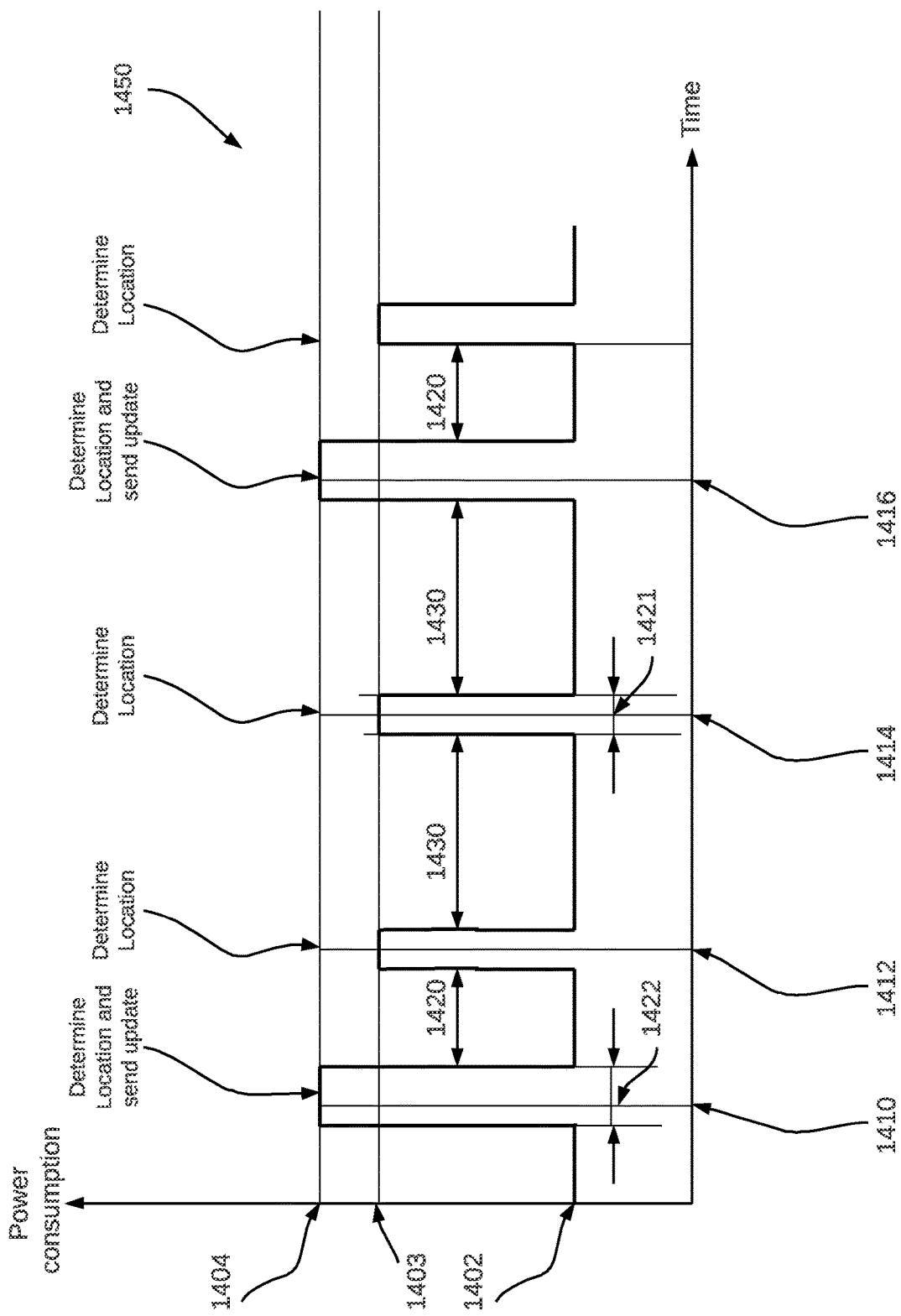
FIG. 15 is a graph showing the power consumption of the telematics device versus time during a transportation mode power-saving scheme, in accordance with other embodiments of the present disclosure.

As a variation on the transportation mode power-saving scheme 1400 of FIG. 14, the telematics device 200 may send location updates only when the location determined at a wake-up duration is different from the location determined at the previous wake-up duration. FIG. 15 depicts a modified transportation mode power-saving scheme 1450, in accordance with other embodiments of the present disclosure. The transportation mode power-saving scheme 1450 features a shorter wake-up duration 1421 during which the telematics device 200 consumes power at a second wake-up power consumption level 1403 which is lower than the first wake-up power consumption level 1404. When the current location determined during a current wake-up duration is similar to the previous location determined during the previous wake-up duration, then the current wake-up duration has a shorter wake-up duration 1421 and the power consumption of the telematics device 200 during the current wake-up duration is at the second wake-up power consumption level 1403, which is lower than the first wake-up power consumption level 1404. The reason for the shorter wake-up duration and the lower wake-up power consumption is that the telematics device does not power up the network interface 220 and refrains from transmitting the location data 207 to the telematics server 300. When no location update is received by the telematics server 300, the telematics server 300 assumes that the telematic device 200 is at the same location until the telematics server 300 receives a location update containing location data 207 from the telematics device 200. Since the network interface 220 may be a cellular modem, powering up the network interface 220, locating a network, connecting to the network, and sending the location data 207 extends the wake-up duration. The network interface 220 may include a wireless transceiver that consumes more power such that the telematics device consumes power at the first wake-up power consumption level 1404. Advantageously, reporting the location data 207 only upon detecting a change from a prior location to a current location reduces the average power consumption of the telematics device 200 over the embodiment of FIG. 14.

Figure 16:
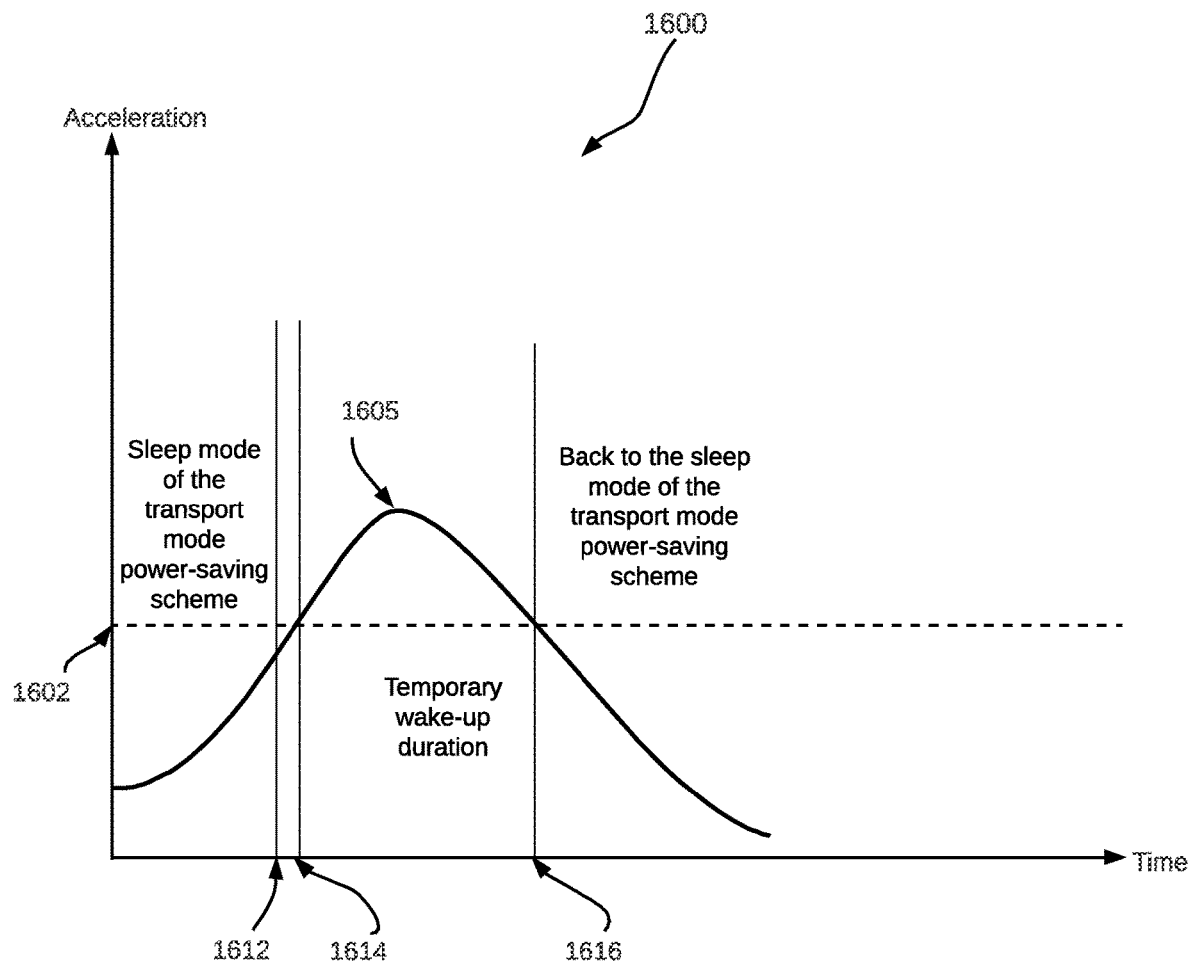
FIG. 16 is a graph showing an acceleration profile by an accelerometer of the telematics device capturing an impact or a fall during a transportation mode power-saving scheme, in accordance with embodiments of the present disclosure.

In addition to waking up from a sleep periodically to determine the location, the telematics device 200 may also wake up during a sleep duration based on a motion detection event 912. While in transportation mode, the motion detection event 912 is one indicating an impact or a fall. An impact is characterized by an acceleration value over an impact acceleration threshold in the X-Y plane of the vehicle in which the telematics device 200 is installed. A fall is characterized by an acceleration value over a certain threshold in the Z-plane of the vehicle in which the telematics device 200 is installed. FIG. 16 shows a graph 1600 illustrating an acceleration profile 1605 as measured by any one of an X-accelerometer, a Y-accelerometer, or a Z-accelerometer. Alternatively, the acceleration profile 1605 may be the resultant acceleration of an X-accelerometer, a Y-accelerometer, and a Z-accelerometer calculated as the root mean square thereof. Similar to FIG. 10, the vertical axis represents the instantaneous acceleration value while the horizontal axis represents time.

The graph 1600 shows an acceleration profile 1605 showing acceleration values changing over time. A second acceleration threshold 1602 which is higher than the first acceleration threshold 1002 of FIG. 10 is shown. The second acceleration threshold 1602 is an impact acceleration triggers a wake-up of the telematics device 200 and is consistent with a sudden movement such as an impact or a fall. In the depicted graph, the telematics device 200 starts in the sleep mode of the transport mode power-saving scheme. For example, the telematics device 200 may be in the short sleep duration 1420 or the long sleep duration 1430. At time 1614, the instantaneous acceleration of the acceleration profile 1605 is greater than the second acceleration threshold, which is an impact or a fall acceleration threshold. At time 1614, the telematics device 200 wakes up to capture further acceleration values from the accelerometers installed therein. The telematics device 200 remains in a wake-up mode for a temporary wake-up duration until the instantaneous acceleration value of the acceleration profile 1605 drops below the second acceleration threshold 1602. During wake-up the telematics device 200 enables the network interface 220 and sends sensor data 205 including the acceleration values which are above the second acceleration threshold 1602. The acceleration values are sent with their corresponding times that range between the time 1614 of the first acceleration values that is above the second acceleration threshold 1602 and ending with the time 1616 of the last acceleration value above the second acceleration threshold 1602. In some embodiments, the accelerometers are equipped with first-in-first-out (FIFO) buffers that capture prior acceleration values. In such embodiments acceleration values between the time 1612 and the time 1614 may also be sent as part of the sensor data 205. In some embodiments, the telematics device 200 sends location data 207 along with the sensor data during the temporary wake-up duration.

The transport mode thus configures a telematics device 200 to report one or both of the location and the impact or fall information to the telematics server 300 while maintaining low-power consumption so as not to drain the vehicle in which the telematics device 200 is installed.

Figure 17:
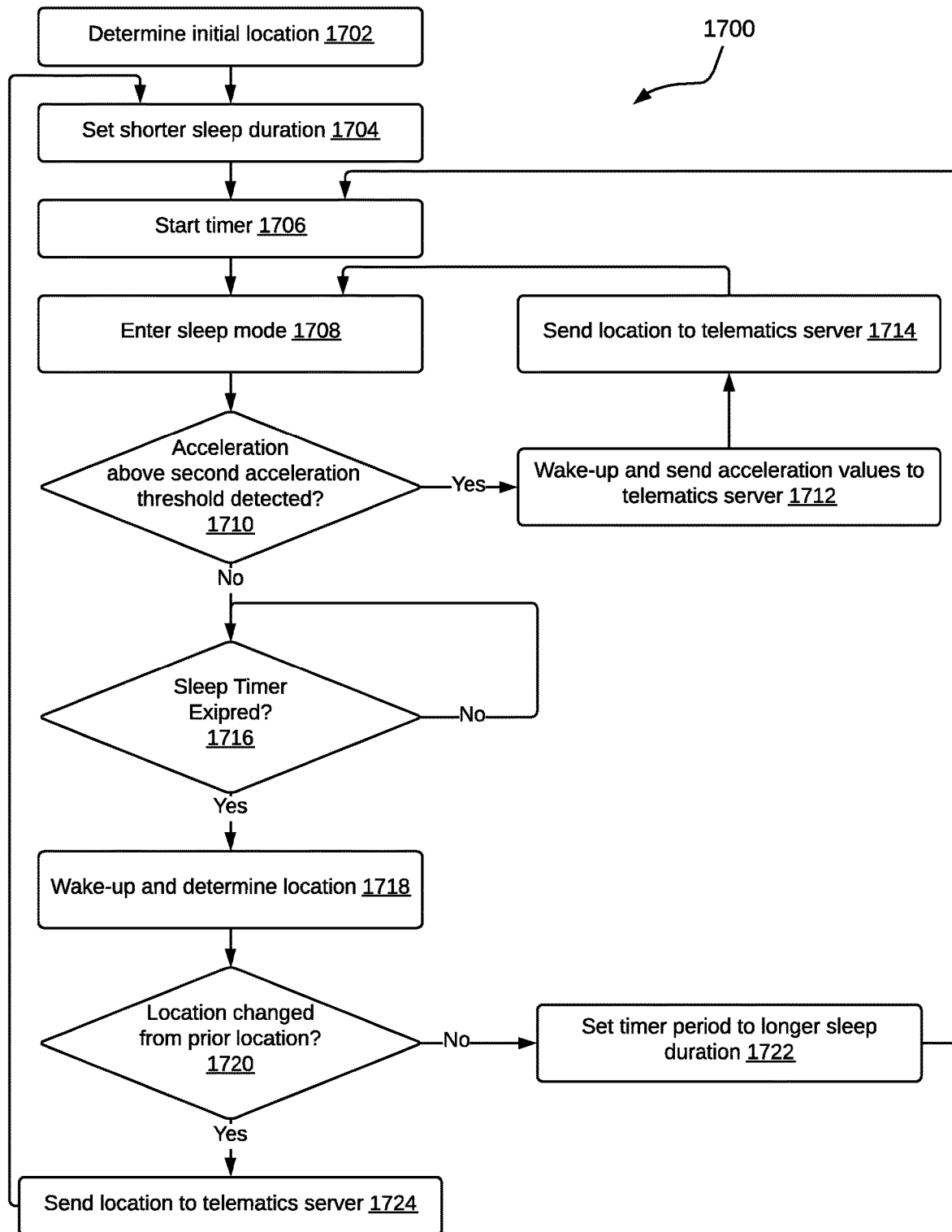
FIG. 17 is a method of operating a telematics device in transportation mode, in accordance with embodiments of the present disclosure.

FIG. 17 depicts a method 1700 of operating a telematics device 200 in transport mode, in accordance with embodiments of the present disclosure.

At step 1702, the telematics device 200 determines an initial location thereof. The initial location may be part of the location data 207 determined by the location module 206. The initial location may be determined upon the telematics device 200 entering the transportation mode.

At step 1704, the telematics device 200 initially sets a timer expiration period to a duration equal to the shorter sleep duration 1420.

At step 1706, the telematics device starts a timer. The timer may be a hardware timer which is a peripheral of the telematics device controller 230, or may be a software timer.

At step 1708, the telematics device 200 enters sleep mode in which it is running at a slow clock, has most of the components thereof powered off except motion sensors such as accelerometers which are enabled. The telematics device 200 is configured to wake up when an acceleration above a second acceleration threshold such as the second acceleration threshold 1602 is detected.

At step 1710, the telematics device 200 checks whether an acceleration value higher than the second acceleration threshold 1602 which corresponds to an impact, or a fall is detected. If an acceleration higher than the second acceleration threshold 1602 is detected, then control goes to step 1712. If no acceleration value higher than the second acceleration threshold is detected, then control goes to step 1716. The step 1710 may comprise receiving an interrupt signal from an accelerometer and verifying that the acceleration value of the accelerometer which triggered the interrupt signal is above the second acceleration threshold.

At step 1712, the telematics device 200 wakes up from sleep. The wake-up may be caused by an interrupt signal generated by an accelerometer which was configured to generate an interrupt if it reads an acceleration value above a particular threshold, in this case the second acceleration threshold 1602. Upon waking up, the telematics device 200 may send the acceleration values as part of the sensor data 205 to the telematics server 300. The acceleration values may be accompanied by corresponding time stamps thereof.

At step 1714, the telematics device 200 may optionally send location data 207 to the telematics server 300. In some embodiments, this step is optional if the telematics server 300 only expects an indication of an impact or a fall of the vehicle without the location at which the impact or fall had taken place. In other embodiments, the location at which the impact or fall had taken place is expected at the telematics server 300 and therefore step 1714 is carried out. In some embodiments, the location data 207 is only sent if the location at the time of impact or fall has changed from the previous location determined by the telematics device 200 at a previous wake-up duration.

At step 1716, the telematics device 200 checks whether the sleep timer has expired. The step 1716 may comprise an interrupt handler that gets called when the timer expires and does not get called when the timer does not expire. If the timer has not expired, control stays in step 1716. In some implementations, if a timer interrupt handler is called, that is an indication that the timer has expired. In some implementations, the interrupt handler may check some status bits in a status register to verify that the timer has expired. If the sleep timer has expired, control goes to step 1718.

At step 1718, the telematics device 200 wakes up from sleep. For example, the telematics device controller 230 runs at a normal clock speed and the location module 206 is enabled so it may capture the current location of the telematics device 200.

At step 1720, the current location of the telematics device 200 is compared with the previous location of the telematics device 200 captured earlier by the location module 206. If the telematics device location has changed, control goes to step 1724. If the telematics device location has not changed, control goes to step 1722.

At step 1722, the timer period of the sleep timer is changed to a longer sleep duration. For example, if the shorter sleep duration was a few hours, such as 6 hours, the longer sleep duration may be 24 hours to a few days. The rationale behind using a longer sleep duration is that the telematics device 200 has not recorded a change in location. The vehicle to which the telematics device 200 is coupled may be on a ship that is sitting at a dock for a few days. In order to reduce the power consumption of the telematics device 200, the telematics device 200 sleeps for longer durations before waking up to check its location. After step 1722, control goes back to step 1706 where the sleep timer is started.

At step 1724, the device sends location data 207 containing the current location thereof to the telematics server. Since the location is different from the previous location, as determined in step 1720, the telematics server 300 may need to update the location of the telematics device 200 and the vehicle to which it is coupled in the telematics database 310.

After step 1724, control returns to step 1704. Since the location of the telematics device 200 has changed, step 1704 ensures that the telematics device 200 is using the shorter sleep duration to get more frequent readings of the location and update the telematics server 300 accordingly.

Figure 18:
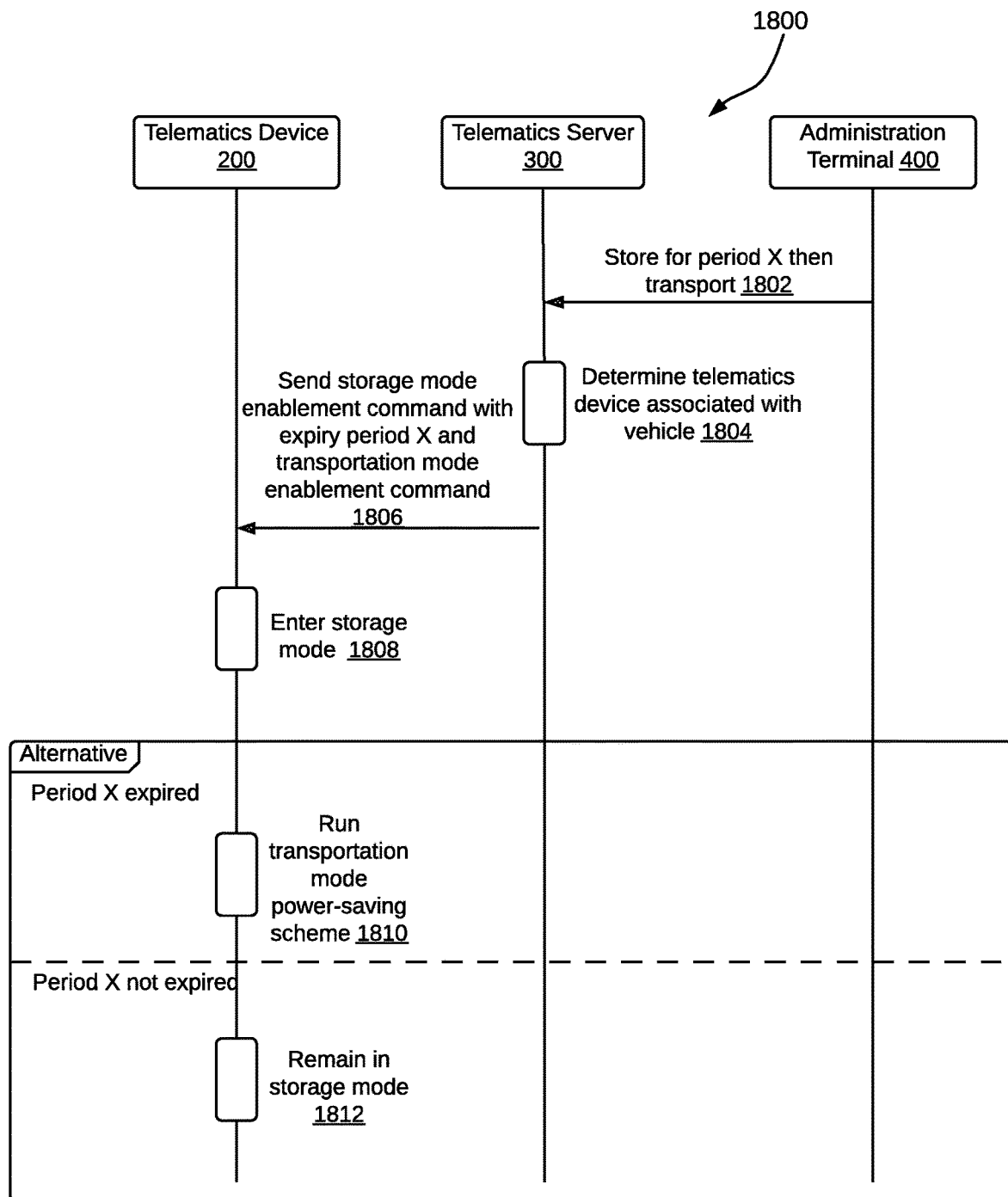
FIG. 18 is a message sequence diagram illustrating a combined command to enable both a storage mode and power-saving scheme, in accordance with embodiments of the present disclosure.

In some embodiments, the storage and shipping (transportation) schedules of a particular asset (i.e., a vehicle) or a plurality of assets is known. For example, it may be known that an asset will be stored at a warehouse for 7 days, then placed in a trailer of a transport truck to be transported to a new destination. In this embodiment, the telematics server may send a storage mode enablement command 906 to the telematics device 200 coupled to the asset, and the storage mode enablement command may include a storage mode duration after which the device exits storage mode. For example, with reference to FIG. 18, there is shown a method 1800 wherein the telematics server 300 sends a combined command to the telematics device 200. The combined command instructs the telematics device 200 to enter the storage mode for predetermined period of time, and then enter transportation mode (i.e., run a transportation mode power-saving scheme).

At step 1802, administration terminal sends a message to the telematics server 300 indicating that a particular vehicle will be stored for a predetermined period and then transported.

At step 1804, the telematics server 300 locates the particular vehicle in the telematics database 310 and identifies the telematics device 200 coupled to the particular vehicle.

At step 1806, the telematics server 300 sends a combined command to the telematics device 200. The combined command comprises a storage mode enablement command with a storage mode expiry period and a transportation mode enablement command.

At step 1808, the telematics device 200 enters storage mode in response to receiving the storage mode enablement command. The telematics device 200 configures a timer to expire after the storage mode expiry period has elapsed. The telematics device 200 also sets a transportation mode enablement flag indicating that when the telematic device 200 exits the storage mode, the telematics device 200 enables a transportation mode power-saving scheme.

At step 1808, the storage mode expiry period has elapsed. The telematics device 200 exits the storage mode and checks the transportation mode enablement flag.

At step 1810, upon detecting that the transportation mode enablement flag is set, the telematics device runs a transportation mode power-saving scheme.

At step 1812, if the storage mode expiry period has not elapsed, the telematics device 200 remains in storage mode.

It should be noted that some steps have not been shown in the method 1800 for simplicity and brevity only. For example, the method 1800 may still check whether the vehicle to which the telematics device 200 is couples is on or off and defer entering the storage mode until the vehicle is off. The method 1800 may also contain steps in which the telematics device 200 reports to the telematics server 300 the mode of operation thereof. The method 1800 may also contain steps in which the telematics server 300 updates the mode or status of the telematics device 200 in a telematics database 310.

In some embodiments, the storage mode enablement command 906 does not contain a duration in which case the telematics device 200 remains in storage mode 930 until a motion detection event 912 takes place. When a motion detection event 912 takes place, the telematics device exits the storage mode 930 and checks a transportation mode enablement flag as discussed above. In such case, the telematics device 200 runs a transportation mode power-saving scheme in response to exiting a storage mode in response to detecting a motion that meets the conditions for exiting storage mode as discussed above.

Figure 19:
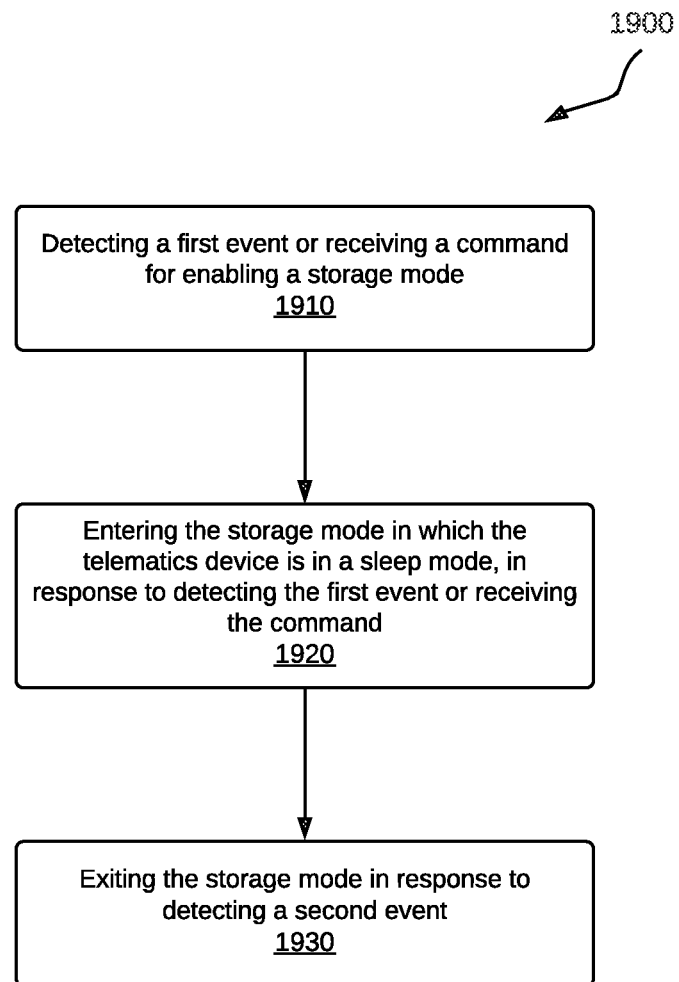
FIG. 19 is a flow chart depicting a method of enabling storage mode on a telematics device, in accordance with embodiments of the present disclosure.

FIG. 19 depicts a method 1900 of enabling a storage mode in a telematics device, in accordance with embodiments of the present disclosure.

At step 1910, the telematics device detects a first event or receives a command for enabling the storage mode.

At step 1920, the telematics device enters the storage mode in which the telematics device is in sleep mode, in response to detecting the first event or receiving the command.

At step 1930, the telematics device exits the storage mode in response to detecting a second event.

Figure 20:
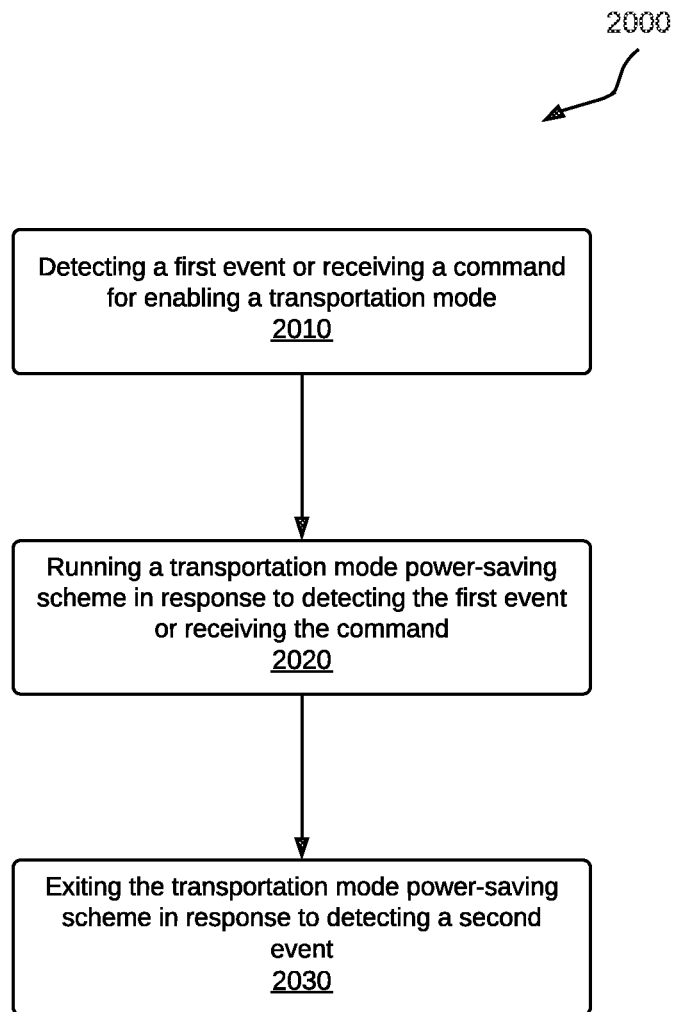
FIG. 20 is a flow chart depicting a method of enabling transportation mode on a telematics device, in accordance with embodiments of the present disclosure.

FIG. 20 depicts a method 2000 of enabling a transportation mode power-saving scheme in a telematics device, in accordance with embodiments of the present disclosure.

At step 2010, the telematics device detects a first event or receives a command for enabling a transportation mode.

At step 2020, the telematics device runs a transportation mode power-saving scheme in response to detecting the first event or receiving the command.

At step 2030, the telematics device exits the transportation mode power-saving scheme in response to detecting a second event.

It should be noted that certain operations in the methods described herein may be embodied in machine-executable programming instructions storable on non-transitory machine-readable storage medium and executable by a processor or a controller.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method, comprising:
    sending, by a telematics server, a combined command to the telematics device, the combined command comprising:
        a storage mode enablement command with a storage mode expiry period, and
        a transportation mode enablement command;
    receiving, at the telematics device, the storage mode enablement command;
    entering, by the telematics device, a storage mode in which the telematics device is in a sleep mode, in response to receiving the storage mode enablement command; and
    in response to an expiry of the storage mode expiry period:
        exiting, by the telematics device, the storage mode; and
        running a transportation mode power-saving scheme, including:
        a) waking up for a first wake-up duration during which the telematics device determines a first location thereof and consumes power at a first wake-up power consumption level;
        b) entering sleep mode for a first sleep duration;
        c) waking up for a second wake-up duration during which the telematics device determines a second location thereof and consumes power at a second wake-up power consumption level which is lower than the first wake-up power consumption level;
        d) if the second location is the same as the first location, entering sleep mode for a second duration which is longer than the first sleep duration;
        e) if the second location is different from the first location, entering sleep mode for a second duration which is the same as the first sleep duration; and
        f) repeating the steps a) through e).

2. The method of claim 1, wherein the combined command is sent by the telematics server in response to a message from an administration terminal.

3. The method of claim 1, wherein entering the storage mode, by the telematics device, further comprises:
    checking whether a vehicle coupled to the telematics device is on;
    in response to determining that the vehicle is on, waiting until the vehicle is off before entering the storage mode; and
    if the vehicle is off, entering the storage mode.

4. The method of claim 3, wherein waiting until the vehicle is off before entering the storage mode comprises buffering the storage mode enablement command.

5. The method of claim 4, wherein waiting until the vehicle is off before entering the storage mode comprises setting a flag indicating that the telematics device is to enter the storage mode upon detecting that the vehicle has been turned off.

6. The method of claim 1, further comprising sending a storage mode acknowledgement command to the telematics server.

7. The method of claim 6, wherein sending the storage mode acknowledgement command is carried out upon entering the storage mode and before the telematics device powers down a network interface thereof.

8. A telematics system, comprising:
    a telematics device;
    a network; and
    a telematics server coupled to the telematics device over the network;
    the telematics system configured to:
        send, by the telematics server, combined command to the telematics device, the combined command comprising;
            a storage mode enablement command with a storage mode expiry period, and
            a transportation mode enablement command;
        receive, at the telematics device, the storage mode enablement command;
        enter, by the telematics device, the storage mode in which the telematics device is in a sleep mode, in response to receiving the storage mode enablement command; and
        in response to an expiry of the storage mode expiry period:
            exit, by the telematics device, the storage mode; and
            run a transportation mode power-saving scheme which configures the telematics device to:
            a) wake up for a first wake-up duration during which the telematics device determines a first location thereof and consumes power at a first wake-up power consumption level;
            b) enter sleep mode for a first sleep duration;
            c) wake up for a second wake-up duration during which the telematics device determines a second location thereof and consumes power at a second wake-up power consumption level which is lower than the first wake-up power consumption level;
            d) if the second location is the same as the first location, enter sleep mode for a second duration which is longer than the first sleep duration;

e) if the second location is different from the first location, enter sleep mode for a second duration which is the same as the first sleep duration; and f) repeat the steps a) through e).

9. The telematics system of claim 8, further comprising an administration terminal in communication with the telematics server over the network, wherein the combined command is sent by the telematics server in response to a message from the administration terminal.

10. The system of claim 8, wherein telematics device, when entering the storage mode, is further configured to:

check whether a vehicle coupled to the telematics device is on, in response to determining that the vehicle is on, wait until the vehicle is off before entering the storage mode; and if the vehicle is off, enter the storage mode.

11. The system of claim 10, wherein the telematics device buffers the storage mode enablement command.

12. The system of claim 10, wherein the telematics device set a flag indicating that the telematics device is to enter the storage mode upon detecting that the vehicle has been turned off.

13. The system of claim 8, wherein the telematics device is further configured to send a storage mode acknowledgement command to the telematics server.

14. The system of claim 13, wherein the telematics device sends the storage mode acknowledgement command as the telematics device enters storage mode and before the telematics device powers down a network interface thereof.

\* \* \* \* \*